United States Patent
Prakash

(10) Patent No.: US 9,154,514 B1
(45) Date of Patent: Oct. 6, 2015

(54) SYSTEMS AND METHODS FOR ELECTRONIC MESSAGE ANALYSIS

(71) Applicant: ASTRA IDENTITY, INC, Acton, MA (US)

(72) Inventor: Gagan Prakash, Acton, MA (US)

(73) Assignee: Astra Identity, Inc., Acton, MA (US)

( * ) Notice: Subject to any disclaimer, the term of this patent is extended or adjusted under 35 U.S.C. 154(b) by 0 days.

(21) Appl. No.: 14/045,244

(22) Filed: Oct. 3, 2013

Related U.S. Application Data

(63) Continuation-in-part of application No. 13/668,349, filed on Nov. 5, 2012, now Pat. No. 8,566,938.

(51) Int. Cl.
  *H04L 29/14* (2006.01)
  *H04L 29/06* (2006.01)

(52) U.S. Cl.
  CPC ........ *H04L 63/1408* (2013.01); *H04L 63/1483* (2013.01)

(58) Field of Classification Search
  None
  See application file for complete search history.

(56) References Cited

U.S. PATENT DOCUMENTS

| | | | |
|---|---|---|---|
| 8,135,780 B2 * | 3/2012 | Gillum | 709/206 |
| 2005/0015455 A1 | 1/2005 | Liu | |
| 2006/0031510 A1 | 2/2006 | Beck et al. | |
| 2006/0123464 A1 | 6/2006 | Goodman et al. | |
| 2006/0168066 A1 | 7/2006 | Helsper et al. | |
| 2007/0101423 A1 | 5/2007 | Oliver et al. | |
| 2008/0133672 A1 | 6/2008 | Gillum | |
| 2012/0254333 A1 * | 10/2012 | Chandramouli et al. | 709/206 |
| 2012/0303726 A1 | 11/2012 | Hwang | |

OTHER PUBLICATIONS

Bergholz et al., Improved Phishing Detection using Model-Based Features, 2008.*
Chandrasekaran et al., Phishing E-mail Detection Based on Structural Properties, 2006.*
Zhan et al., Phishing Detection Using Stochastic Learning-Based Weak Estimators, IEEE, 2011.*
Spoof Email Tutorial, ebay 2006, 4 pages, as identified and included in Office Action to parent U.S. Appl. No. 13/668,349 mailed on Mar. 5, 2013.
Popham, Jeffrey D, Non-Final Office Action for co-pending U.S. Appl. No. 14/176,113, mailed Jun. 4, 2014, 20 pages, USPTO, USA.
Popham, Jeffrey D, Advisory Action for co-pending U.S. Appl. No. 14/176,113, mailed Feb. 10, 2015, 3 pages, USPTO, USA.
Popham, Jeffrey D, Final Office Action for co-pending U.S. Appl. No. 14/176,113, mailed Nov. 25, 2014, 38 pages, USPTO, USA.

\* cited by examiner

*Primary Examiner* — Minh Dinh
(74) *Attorney, Agent, or Firm* — John Brooks Law LLC; John J Brooks, III

(57) ABSTRACT

Systems and methods for analyzing electronic messages for phishing detection are disclosed. In one example embodiment, whether a received email message is a phishing message is determined based on the outcome of a comparison of a recipient background information to a email characteristic wherein the recipient background information is obtained from an online social network. In some embodiments, whether the received email message is a phishing message is determined by comparing a new received email message profile to an email characteristic profile to determine whether the new received email message profile is similar to the email characteristic profile. In some embodiments, whether the received email message is a phishing message is determined by comparing the email characteristics of the new received email message with pattern characteristics. In some embodiments, the determination is made by comparing a email characteristics of the received message with a historical email characteristic.

24 Claims, 10 Drawing Sheets

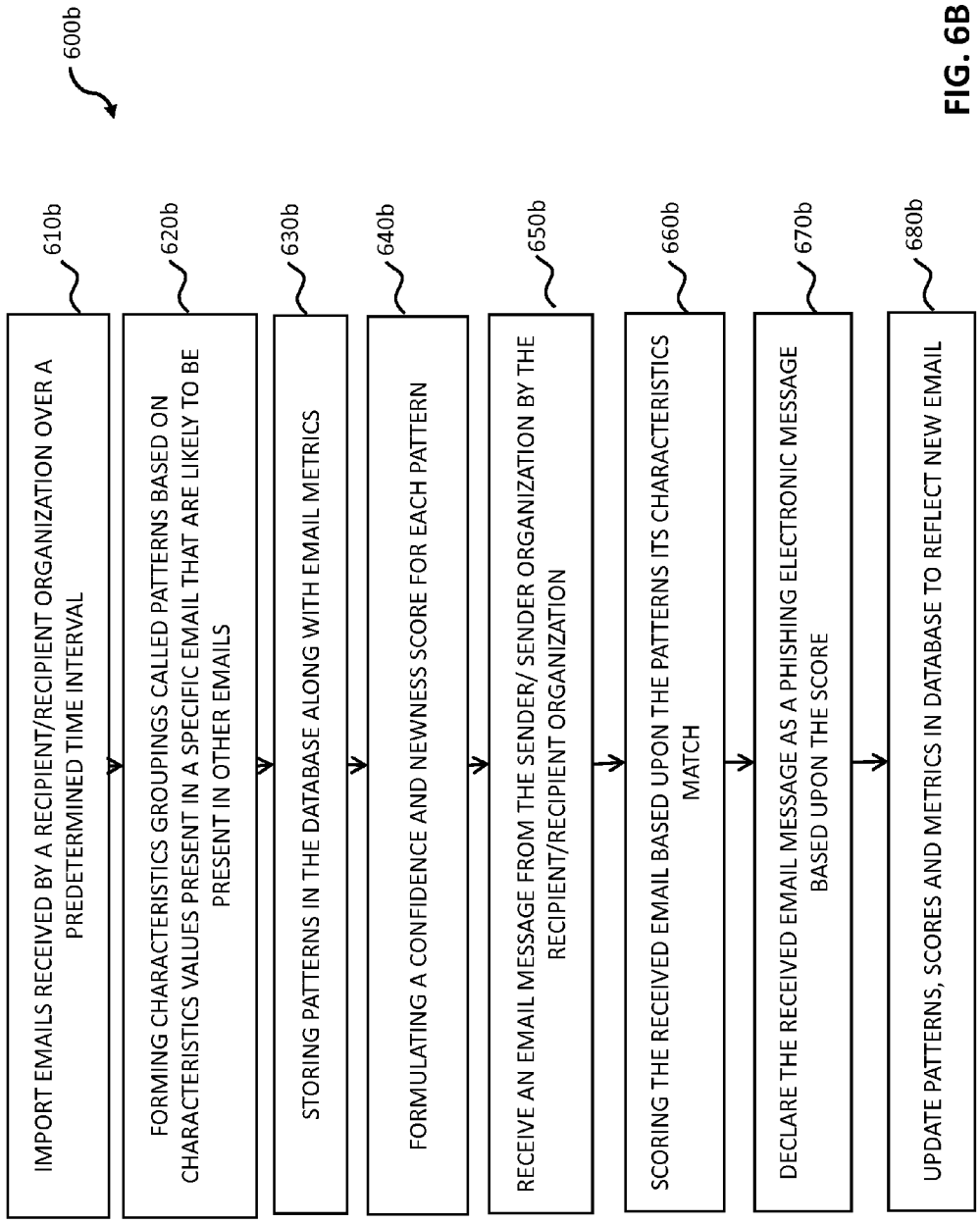

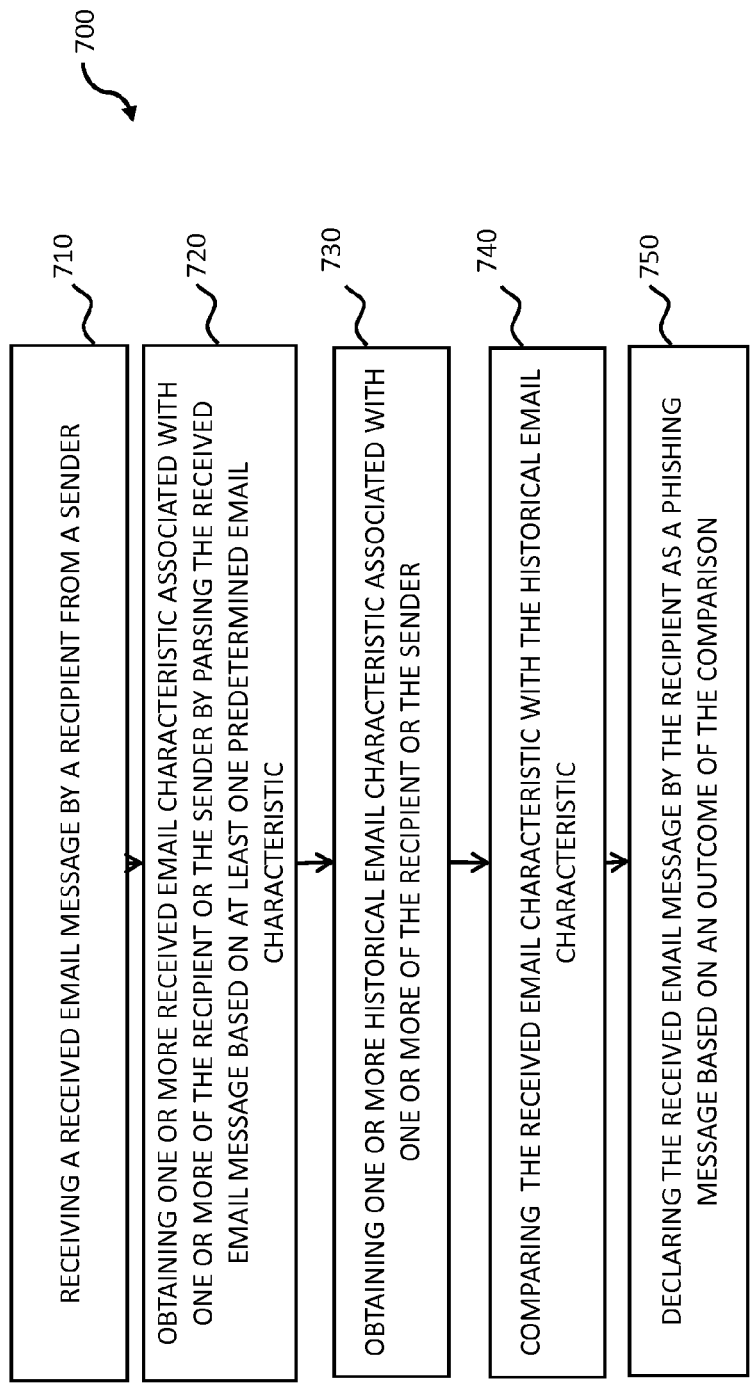

SYSTEMS AND METHODS FOR ELECTRONIC MESSAGE ANALYSIS

CROSS-REFERENCE TO RELATED APPLICATIONS

This application is a continuation in part application of pending U.S. patent application Ser. No. 13/668,349 filed on Nov. 5, 2012 entitled "SYSTEM AND METHOD FOR ELECTRONIC MESSAGE ANALYSIS FOR PHISHING DETECTION", the entire content of which is incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates to the analysis of electronic messages, in particular systems and methods for analyzing electronic messages to determine whether they are phishing messages.

2. Description of the Prior Art

Existing email protocols on the Internet do not validate the identity of the sender of an email. As a result, bad actors impersonate other people's identity in order to increase the likelihood of recipients opening their messages and attachments. This activity is generally referred to as "phishing" and specifically "spear phishing" when the recipient is targeted by the fake sender who is referred to as a "phisher". By getting recipients to open these fake emails, the phishers can increase their likelihood of successfully gaining unauthorized access to confidential data, including trade secrets, state secrets, military information, and other information for a variety of motivations, especially for financial gain through fraud, identity theft and/or data theft. The senders typically target and attack multiple users at a specific organization with impersonated emails in order to gain unauthorized access to their confidential data. Once a recipient opens the fake email and sometimes the attachments, the user's computer may be infected and will be used to send out phishing emails on behalf of the phisher. Some fake emails contain links that when followed takes the user to a website, which may install malware on the recipient's computer or pose as a familiar website and ask for confidential information, such as login credentials and/or account numbers. Perpetrators may also use a compromised computer as the launch point to further penetrate the organization's computer network to access data stored on other computers, servers, and devices. Phishers may also delete and change information or even damage physical systems controlled by computers.

Existing solutions are based on checking IP address associated with the phishing email or checking the text of an email for an URL to detect whether the email is a phishing email. Further, existing solutions are not integrated into email servers and clients and therefore, are restricted to some minimal checks to detect phishing activities. These techniques seem to work only when phishers use IP addresses or URLs that are suspected to be malevolent and therefore, they are typically, not robust enough to prevent sophisticated phishing attacks.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

Systems and methods for analyzing electronic messages are disclosed. In one example embodiment, a computer implemented method is provided for analyzing electronic messages for phishing message detection, the method comprising receiving a received email message by a recipient from a sender, obtaining one or more received email characteristic associated with one or more of the recipient or the sender by parsing the received email message based on at least one predetermined email characteristic, the received email characteristic comprises at least one email characteristic selected from an email data from the received email message, obtaining one or more historical email characteristic associated with one or more of the recipient or the sender, comparing the received email characteristic with the historical email characteristic and declaring the received email message by the recipient as a phishing message based on an outcome of the comparison.

In one example embodiment, a computer implemented method for analyzing electronic messages for phishing message detection is provided, the method comprising receiving a received email message by a recipient from a sender, obtaining at least one email characteristic associated with one or more of the recipient or the sender, obtaining recipient background information associated with the recipient, the recipient background information comprising information from an online social network, comparing the recipient background information to the email characteristic, declaring the received email message by the recipient as a phishing message based on the outcome of the comparison of the recipient background information to the email characteristic. In some embodiments, the recipient background information comprises contact data from a recipient online social network and this recipient background information may be used to determine, whether the sender of an email is legitimate or not. For example, the geography of an email sender can be imputed by using the senders IP address and cross referencing that with a Geo IP database. This geography can then be checked against the physical location, telephone area code, and employment or education address of a contact in the recipient online social network. A match or a mismatch can be used to influence the likelihood of an email being a phishing message. In some embodiments, the recipient background information from the online social network is stored in a database and obtained from the database. In some embodiments, the recipient background information from the online social network is obtained from the online social network.

In one example embodiment, a computer implemented method for analyzing electronic messages for phishing detection is provided, the method comprising receiving a received email message by a recipient from a sender, obtaining one or more email characteristic by parsing the received email message based on at least one predetermined email characteristic, the email characteristic comprising one or more of a sender email characteristic or a recipient email characteristic, storing the email characteristic in a database, applying a text classification engine to the email characteristic to define an email characteristic profile, receiving a new received email message, applying the text classification engine to the new received email message to define a new received email message profile, comparing the new received email message profile to the email characteristic profile to determine whether the new received email message profile is similar to the email characteristic profile and determining whether the new received email message is a phishing message based on the outcome of the comparison. For example, some embodiments may include comparing the writing style of a new received email, where the writing style is a new email characteristic profile of the new received email message, against previous emails from the same sender to the same recipient, where the previous writing style is an email characteristic profile. If a significant difference in style is found then this comparison can be used to influence the likelihood of the email being a phishing message.

In one example embodiment, a computer implemented method for analyzing electronic messages for phishing message detection is provided, the method comprising receiving a plurality of received email messages by a recipient from a sender, obtaining one or more email characteristic by parsing the received email messages based on at least one predetermined email characteristic, storing the received email message characteristic in a database, grouping the received email message characteristic into a plurality of pattern groupings, each pattern grouping being defined by a pattern characteristic, storing the pattern groupings in a database along with a count of received email messages with the email characteristics that place it in the pattern grouping, receiving a new received email message, comparing the email characteristics of the new received email message with the pattern characteristics and declaring the new received email message by the recipient as a phishing message based on the outcome of the comparison.

In some embodiments, parsing the received email message based on at least one predetermined email characteristic comprises analyzing the email characteristics of the received email to identify a value of at least one predetermined email characteristic or to identify whether the at least one predetermined email characteristic is present in the received email.

In one example embodiment, a method for analyzing electronic messages is provided, the method comprising receiving a received email message having a plurality of email characteristics, the email characteristics comprising a Reply-To email address and a recipient address, determining whether the received email message by the recipient to be a questionable phishing message, changing the Reply-To email address to a custom email address if the received email message is the questionable phishing message, allowing the received email message to be delivered to the recipient address, receiving a reply email message from the recipient address at the custom email address, inspecting the reply email message from the recipient to determine whether the questionable phishing message is a phishing message, quarantining the reply email message or forwarding the replay email for manual inspection if the questionable phishing message is the phishing message and delivering the reply to the original Reply-To email address if the questionable phishing message is not the phishing message.

In one example embodiment, a system for analyzing electronic messages for phishing message detection is disclosed. In one embodiment, the system comprises an anti-phishing server and the anti-phishing server includes a processor and memory and wherein the memory includes an anti-phishing module, wherein the anti-phishing module comprises an import module, an analysis and data warehouse module, a mail handler module, an organizational analysis module, an outbound mail relay module, a configuration and management module and a text classification module that separately or in any combination are configured to execute any of the disclosed methods of electronic message analysis. For example, the system may receive an email message by one or more recipients/recipient's organizations from one or more senders/sender's organizations via the mail handler module. The system may be configured to obtain email characteristics by parsing the received email message based on the predetermined email characteristic by the analysis and data warehouse module. The system may be configured to compare the email characteristics of the received email message with email characteristics associated with the recipient/recipient organization and/or the sender/sender organization by the analysis and data warehouse module. The system may be configured to compare the email writing style of the received email message against emails sent from the same sender to the same recipients in the past by the text classification module. The system may be configured to check the sender and the email characteristics against data found in the recipient/recipient organization social networks by the analysis and data warehouse module. The system may be configured to compare the new received email message against one or more pattern groupings of pattern characteristics. The system may be configured to declare the received email message by the recipient/recipient organization as a phishing electronic message based on the outcome of the comparison by the analysis and data warehouse module.

BRIEF DESCRIPTION OF THE SEVERAL VIEWS OF THE DRAWINGS

In order that the manner in which the above-recited and other advantages and features of the invention are obtained, a more particular description of embodiments of the invention briefly described above will be rendered by reference to specific embodiments thereof which are illustrated in the appended drawings. Understanding that these drawings depict only example embodiments of the invention and are not therefore to be considered to be limiting of its scope, the invention will be described and explained with additional specificity and detail through the use of the accompanying drawings in which:

FIG. 6B illustrates a flow diagram of an example method for analyzing electronic messages;

FIG. 7 illustrates a flow diagram of an example method for analyzing electronic messages.

Figure 1:
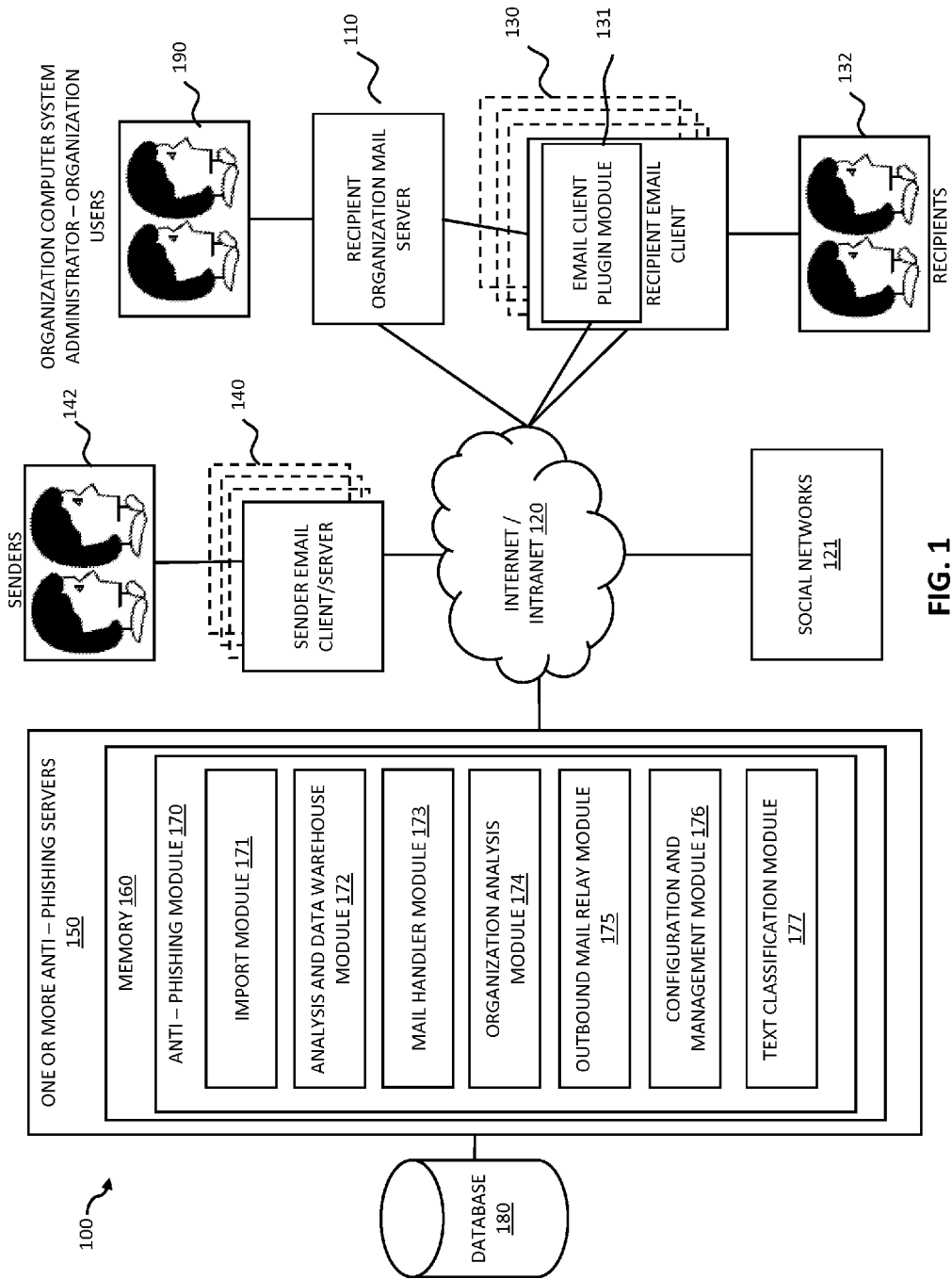
FIG. 1 illustrates an example block diagram of a system for analyzing electronic messages for phishing detection.

The drawings described herein are for illustration purposes only and are not intended to limit the scope of the present disclosure in any way.

DETAILED DESCRIPTION OF THE INVENTION

Systems and methods for electronic message analysis will now be described in detail with reference to the accompanying drawings. In the following detailed description of the examples of the present subject matter, references are made to the accompanying drawings that form a part hereof, and in which are shown by way of illustration specific examples in which the present subject matter may be practiced. These examples are described in sufficient detail to enable those skilled in the art to practice the present subject matter, and it is to be understood that other examples may be utilized and that changes may be made without departing from the scope of the present subject matter. For example, it will be appreciated that, while the following description may describe a system that analyzes email message for detecting phishing message, these embodiments are for illustration purposes only and the systems and methods disclosed herein have wide applicability. The following detailed description is, therefore, not to be taken in a limiting sense, and the scope of the present subject matter is defined by the appended claims.

As used herein, the terms "electronic message", "message", "email message" and "email" are used interchangeably throughout the document and in addition to the definition of the terms as used in the art of data communications, these terms are used to define any type of electronic message in a communication network.

Further, as used herein, in addition to the definition of the term as used in the art of data communications, the term "phishing" is also referred to as "spear phishing" in the document and defines any method of falsely identifying the source or real purpose of a received email message.

Further, as used herein, "online social network" and "social network" are used interchangeably throughout the document and in addition to the definition of the term as used in the art of data communications, these terms are used to define any type of group affiliation of a user that provides information on a user over an Intranet, Internet or other data communications network. Example online social networks include but are not limited to Facebook, LinkedIn, Google+, alumni associations and others.

Further, as used herein, "recipient" and "recipient/recipient organization" are used interchangeably throughout the document and in addition to the definition of the term as used in the art of data communications, these terms are used to define any type of recipient of an electronic message in a communication network which may include for example a user as a recipient or an organization as a recipient.

Further, as used herein, "sender" and "sender/sender organization" are used interchangeably throughout the document and in addition to the definition of the term as used in the art of data communications, these terms are used to define any type of sender of an electronic message in a communication network which may include for example a user as a sender or an organization as a sender.

Further, as used herein, "recipient background information" comprises information associated with a recipient such as but not limited to third party authentication credentials for online social networks, information taken from an online social network, patterns, profiles, email characteristics, email content or any information obtained or derived from such information.

Further, as used herein, the terms "obtain" and "receive", in any tense, in addition to the definition of the terms as used in the art of data communications, these terms are used to define any type of having access to something, such as information, either having access directly or having access to the information that may have been gathered earlier and stored in a database.

One Example Embodiment of a System for Electronic Message Analysis:

FIG. 1 illustrates a block diagram of one example embodiment of a system 100 for analyzing electronic messages. As shown in FIG. 1, the system 100 includes one or more recipient email servers 110 one or more recipient email client 130, one or more sender email client/server 140 that are all coupled to one or more anti-phishing servers 150 via a communication network such as an Internet/Intranet 120. The recipient email client is associated with a recipient 132 and the sender email client is associated with a sender 142. The one or more anti-phishing servers 150 are coupled to a database 180. The recipient email server 110 may be in communication with an organization computer system administrator or organization users 190. As shown in FIG. 1, the recipient email client 130 may include an email client plugin module 131. As shown, memory 160 in the anti-phishing server 150 is coupled to a processor and includes an anti-phishing module 170. The anti-phishing module 170 includes an import module 171, an analysis and data warehouse module 172, mail handler module 173, an organizational analysis module 174, an outbound mail relay module 175, a configuration and management module 176 and a text classification module 177. In some embodiments, the system may further comprise being couple to with third party online social networks 121. The recipient email client 130 and the sender email client 140 may comprise any type of computer implemented interface allowing a user to access electronic messages such as but not limited to desktop software, server software, mobile device software or internet browser based software such as Microsoft Outlook, Gmail. It is understood that the email client may also be a client for other types of electronic messaging such as text messaging.

Embodiments of the disclosed system and modules and other system components are configure to, separately or in any combination, execute any of the disclosed methods of electronic message analysis.

Example Embodiments of Methods for Electronic Message Analysis:

Referring to FIG. 7, one example embodiment of a computer implemented method for analyzing electronic messages 700 is shown. The method comprising receiving a received email message by a recipient from a sender at 710, obtaining one or more received email characteristic associated with one or more of the recipient or the sender from the received email message at 720, obtaining one or more historical email characteristic associated with one or more of the recipient or the sender at 730, comparing the received email characteristic with the historical email characteristic at 740 and declaring the received email message by the recipient as a phishing message based on an outcome of the comparison at 750. The received email message received at step 710 may comprise email data having at least one email characteristic. As shown, in some embodiments, the email characteristics at 720 may be obtained by parsing the received email message based on at least one predetermined email characteristic. In some embodiments, the historical email characteristic associated with one or more of the recipient or the sender is obtained from a database.

In some embodiments, recipient background information such as contact and background information associated with the email recipient/recipient organizations are obtained from recipient/recipient organization's Internet/online social networks. The recipient background information, such as contact and background information, is then stored in the database. Upon receiving an email, email characteristics from the email senders information and background is compared to the recipient background information retrieved from the social networks and the comparison is used as a factor in determining if the email is a phishing attempt.

In some embodiments, the methods may utilize email message profiles to help determine whether the new received email message is a phishing message. In these embodiments, the methods further comprise storing the email characteristic in a database, applying a text classification engine to the email characteristic to define an email characteristic profile, receiving a new received email message, applying the text classification engine to the new received email message to define a new received email message profile, comparing the new received email message profile to the email characteristic profile to determine whether the new received email message profile is similar to the email characteristic profile and determining whether the new received email message is a phishing message based on the outcome of the comparison.

In some embodiments, the methods may utilize pattern groupings to help determine whether the new received email message by the recipient as a phishing message. In these embodiments, the methods may further comprise storing the received email message characteristic in a database, grouping the received email message characteristic into a plurality of pattern groupings, each pattern grouping being defined by a pattern characteristic, storing the pattern groupings in a database along with a count of received email messages with the email characteristics that place it in the pattern grouping, receiving a new received email message at, comparing the email characteristics of the new received email message with the pattern characteristics at and declaring the new received email message by the recipient as a phishing message based on the outcome of the comparison.

In some embodiments, the methods may further comprise: changing a Reply-To email address of the new received email message determined to be the phishing message to a custom email address, allowing the new received email message to be delivered to the recipient of the received email message, receiving a reply from the recipient at the custom email address, further inspecting the new received email message or the reply from the recipient, forwarding the reply to certain users for manual inspection, quarantining the reply and delivering the reply to the original Reply-To email address. For example, one embodiment illustrating the process of changing the Reply-To comprises receiving a new email from a hypothetical sender—John Smith—jsmith@jsmithco.com to a hypothetical recipient Dagny Taggart—dtaggart@taggarttc.com. When this email is received it may be uncertain or questionable if the email is a phishing attempt, so the system may change the Reply-To portion of the email from jsmith@jsmithco.com to cntr1454545@phishingguardian.com and deliver the email to Dagny. At some later point in time, Dagny may reply to this email which would then be routed to the email address of cntr1454545@phishingguardian.com wherein the reply email and the original email from John would be re-analyzed to determine if there is a higher probability of the original email being a phishing attempt or phishing message. Based upon the determination, the reply might either get sent for manual examination, quarantined or routed to the original recipient John Smith.

In some embodiments, parsing the received email message based on at least one predetermined email characteristic comprises analyzing the email characteristics of the received email to identify a value of at least one predetermined email characteristic or to identify whether the at least one predetermined email characteristic is present in the received email. The predetermined email characteristic may be any of the email characteristics and is used to provide a common categorization of at least one email characteristic for analysis and comparison in the disclosed methods.

In some embodiments, the email characteristic may comprise at least one email characteristic selected from an email data from the received email message.

In some embodiments, the email data comprises one selected from the group of: an email metadata and an email content. In some embodiments, email characteristic further comprises at least one email characteristic selected from the group of: a calculated value from the email metadata or the email content, a cross-referenced value from a third party source and a third party value.

In some embodiments, the email characteristic comprises at least one of email characteristics selected from the group consisting of: a network path used to reach a recipient from the sender; a geography associated with an IP address of the sender; an email client a software used by the sender; an email client software version used by the sender; a date, a day of week, a time, a time period of the received email message; a time zone of the sender; a presence and a detail of a digital signatures in the received email message; an email metadata present in a header portion of the received email message; a character set used in a content of the received email message; a format of the received email message; an email length and a subject length; a character case of the received email message; a character case of a subject of the received email message; a style of an introduction at a top of the received email message; a style and content of the sender's signature in a body of the received email message; a use and a frequency of a character, a punctuation, a word, a phrase, a numbers and a whitespace; a number and a length of the words and other statistical measures around the characters; the punctuation, the word, the phrase and their arrangement within a body of the received email message and the subject line; another recipient included in the received email message, to, and copy circulated email addresses; a name of the sender; a from and a reply to email address of the sender; an organization name of the sender; a domain name of the sender; a Domain Name Service (DNS) settings of an organization of the sender including an SPF records; the organization's mail server information including a server ip address; a server network path of the sender; an email server software program of the sender; an email server software version of the sender; a DKIM signature; a spam score from a spam software; a message ID; a volume of email sent by the sender; a volume of email sent by the organization of the sender; a volume of email received by the recipient; a volume of email received by recipient organization; a detail associated with a URL or an attachment in the received email message; whether the recipient has responded to this specific received email message; and a number of interactions between the sender and a recipient of the received email message.

In some embodiments, the methods may further comprise storing the email characteristics of the received email message associated with the recipient and the sender of the received email message in a database as historical email characteristics associated with the recipient and the sender of historical emails.

In some embodiments, the methods further comprise storing the recipient background information in the database.

In some embodiments, the method of comparing the email characteristic of the received email message with the email characteristic associated with one or more of the recipient or the sender comprises, obtaining the historical email characteristics associated with one or more of the recipient or the sender along with a statistical distribution of the historical email characteristics and comparing the email characteristics of the new received email message with the similar email characteristics associated with one or more of the recipient or sender from historical email characteristics having a high statistical distribution. Some embodiments of the methods may further comprise determining a degree of variance of each email characteristic when compared with the similar characteristic associated with one or more of the recipient or sender from historical emails having a high statistical distribution, establishing a score based on the determined degree of variance for each email characteristic and a pre-assigned weight for each characteristic and obtaining a combined score by adding scores of one or more of the email characteristics in the received email message based on a pre-assigned weight.

In some embodiments, the methods may further comprise allowing an administrator to select at least one desired email characteristic to be included in the set of email characteristics used for comparing one or more of the email characteristics of the received email message with the email characteristics associated with one or more of the recipient or the sender comparing the characteristics of the received email message to analyze the likelihood that the received email message is the phishing message. In some embodiment, the method may allow the administrator to assign a weight of how much each of the at least one desired characteristics should influence determining the likelihood that the received email message is the phishing message. In some embodiments, the methods may further comprise allowing an administrator to specify at least one of the email characteristic as at least one email characteristic indicative of the phishing messages; and flagging new received email messages as new phishing messages if the received email message has a set of email characteristics matching the set indicative of phishing messages.

In some embodiments, the methods may further comprise importing a plurality of the received email messages received by the recipient over a predetermined time interval, obtaining at least one obtained email characteristic of the imported received email messages by parsing the recipient's received email messages based on the predetermined email characteristic and storing the obtained email characteristic in a database. The predetermined time interval may comprise any time interval defined by the system or user through a user interface.

In some embodiments, the methods may further comprise storing logs of received email messages and any associated phishing activity along with details of why the received email message was determined to be the phishing message and outputting the logs of the received email messages and any associated phishing activity for viewing on a display device.

In some embodiments, the methods may further comprise quarantining received email message determined to be the phishing message as a quarantined email, forwarding quarantined email to certain users and/or adding a certain text to the header or subject of quarantined email to mark them as suspect and/or outputting quarantined email for viewing on a display device.

In some embodiments, the methods may further comprise parsing outbound emails sent by the recipient based on a predetermined email characteristic to determine if the outbound email is a response or forward of a previously received email by the recipient, updating the database based on the above determination to indicate that the characteristics of the previously received email are more likely to represent a legitimate sender, comparing ongoing emails received from the sender with stored email characteristics and declaring any of the ongoing emails received from the sender as the phishing message based on the outcome of the comparison.

In some embodiments, the methods may further comprise including visual identifications and reasoning information to the received email message based on the outcome of the comparison to assist the recipient declare the received email message as the phishing message.

In some embodiments, the methods may further comprise determining a coordinated phishing attacks against an organization by spotting a plurality of phishing attacks having similar characteristics against a plurality of recipients in the organization.

In some embodiments, the methods may further comprise monitoring changing patterns of outbound emails to determine whether an email client has been compromised and the sender is sending the phishing message.

In some embodiments, the methods may further comprise allowing users to specify an email as a phishing attempt and use the email characteristics of this flagged email to filter received email messages to other recipients in the organization.

In some embodiments, the methods may further comprise marking certain combination of characteristics to be indicative of the phishing message and determining received email messages with similar email characteristics as likely phishing messages and/or phishing attacks.

In some embodiments, coordinated phishing attacks against an organization are determined by spotting phishing attacks having similar characteristics against multiple users in the organization. In some embodiments, changing patterns of outbound emails are monitored to determine whether an email client has been compromised and the sender/sender organization is sending a phishing email. In some embodiments, users are allowed to specify an email as a phishing attempt and use the characteristics of this flagged email to filter messages to other users in the organization.

Figure 2:
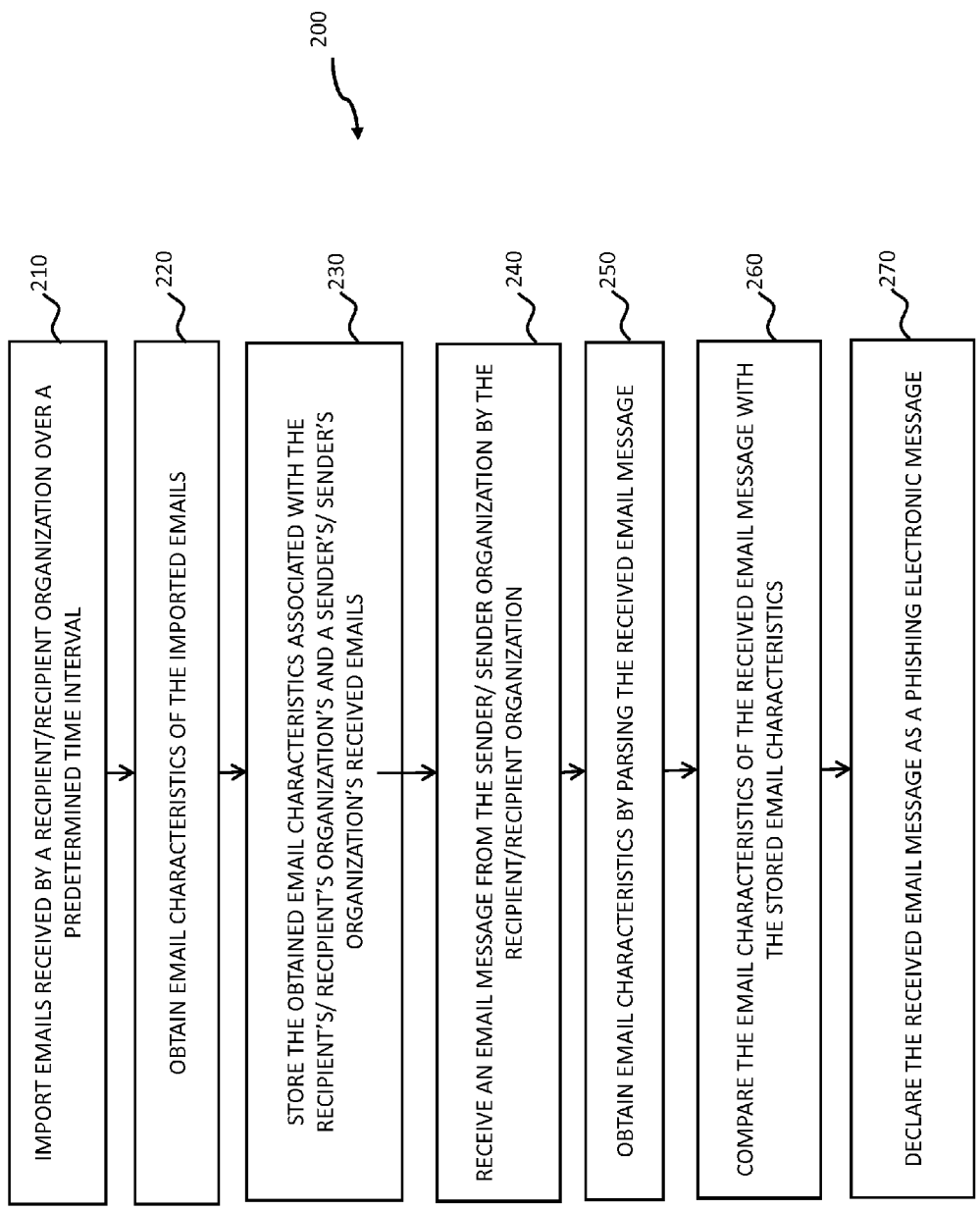
FIG. 2 illustrates a flow diagram of an example method for analyzing electronic messages for phishing detection.

FIG. 2 illustrates an example embodiment of methods for electronic message analysis. FIG. 2 shows a flow diagram of method 200 for carrying out analysis of electronic messages.

Referring to FIG. 2, at block 210, emails received by the recipient/recipient organization over a predetermined time interval are imported.

At block 220, email characteristics of the imported emails are obtained by parsing the recipient's/recipient organization's received emails based on the predetermined email characteristic. Exemplary email characteristics are network path used to reach a recipient/recipient organization, geography associated with IP address, email client software used by the sender/sender organization, email client software version used by the sender/sender organization, date, day of week, time, time period of the email, time zone of the sender/sender organization, presence and details of digital signatures in the email, meta data present in header portion of the email, character set used in content of the email, format of the email, email length and subject length, character case of the email, character case of the subject, style of introduction at the top of the email, style and content of the sender/sender organization's signature in the body of the email, use and frequency of characters, punctuation, words, phrases, numbers and whitespace, number and length of words and other statistical measures around the characters, punctuations words, phrases and their arrangement within the body of email and the subject line, other recipients/recipient organizations included in the email, to, and copy circulated (cc'd) email addresses, senders name, senders from and reply to email address, senders organization name, senders domain name, sender's organization's Domain Name Service (DNS) settings including SPF records, sender organization's mail server information, including server ip address, sender server network path, sender email server software and software version, DKIM signature, spam scoring from spam software, message ID, volume of email sent by the sender, volume of email sent by sender's organization, volume of email received by the recipient, volume of email received by recipient organization, details associated with URLs or attachments in the email, whether the recipient/recipient organization has responded to this specific email, and number of interactions between sender and recipient associated with the email and the like.

At block 230, the obtained email characteristics associated with the recipient's/recipient's organization's and the sender's/sender organization's received emails are stored in a database. At block 240, an email message is received from a sender/sender organization for a recipient/recipient organization. At block 250, email characteristics are obtained by parsing the received email message based on a predetermined email characteristic.

At block 260, the email characteristics of the received email message is compared with the email characteristics associated with the recipient/recipient organization, and/or the sender/sender organization. In some embodiments, an administrator is allowed to select desired email characteristics to be included in the set of characteristics used for comparing the characteristics of the received email message and to assign a weight of how much each characteristic should influence the likelihood that a new message is a phishing message. Further in some embodiments, email characteristics associated with the recipient/recipient organization and sender/sender organization along with their statistical distribution is obtained. The email characteristics of the received email message are then compared with the prior email characteristics associated with the recipient/recipient organization and/or sender/sender organization having a high statistical distribution. In some embodiments, email determined as phishing emails are flagged and may be stored for subsequent analysis in determining phishing characteristics of a received email.

At block 270, the received email message by the recipient/recipient organization is then declared as a phishing electronic message based on the outcome of the comparison.

Figure 3:
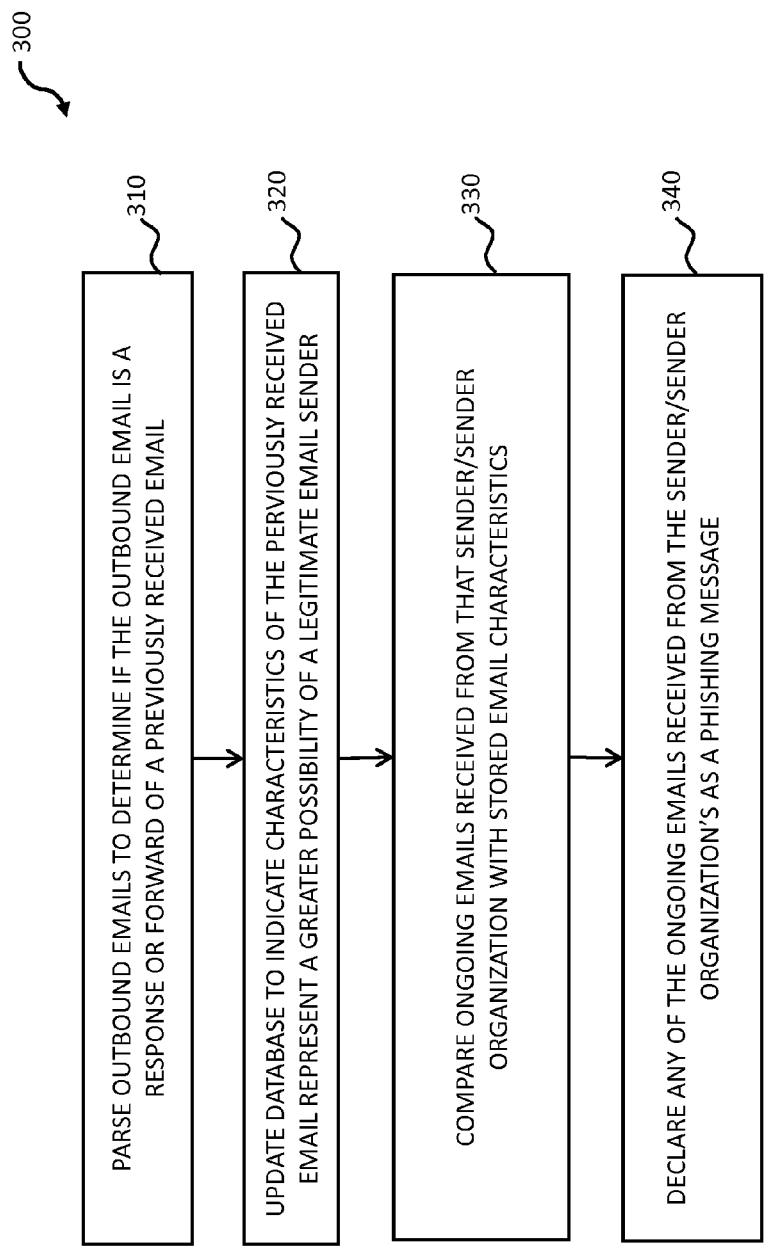
FIG. 3 illustrates a flow diagram of an example method for analyzing electronic messages.

FIG. 3 illustrates a flow diagram of another example embodiment of methods for carrying out analysis of electronic messages for phishing detection. At block 310 of method 300, outbound emails sent by the recipient/recipient organization are parsed based on a set of predetermined outbound email characteristics to determine if the outbound email is a response or forward of a previously received email by the recipient/recipient organization. At block 320, database is updated to reflect that the characteristics of the original/previous email that this new email is a reply or forward to most likely represent a legitimate sender/sender organization. At block 330, ongoing emails received from that sender/sender organization are compared with stored email characteristics. At block 340, any of the ongoing emails received from sender/sender organizations are declared as phishing based on the outcome of the comparison.

Now, referring to FIG. 4, a flow diagram illustrating one example embodiment 400 for carrying out analysis of electronic messages for phishing detection will be described. The method comprises receiving a received email message by a recipient from a sender at 410, obtaining at least one email characteristic associated with one or more of the recipient or the sender at 420, obtaining recipient background information associated with the recipient from an online social network at 430, comparing the recipient background information to the email characteristic at 440 and declaring the received email message by the recipient as a phishing message based on the outcome of the comparison of the recipient background information to the email characteristic at 450. In some embodiments, the step of obtaining recipient background information associated with the recipient from an online social network at 430 may comprise obtaining the recipient background information from the online social network directly or by obtaining the recipient background information retrieved earlier and stored in a database.

In some embodiments, the recipient background information comprises a third party authentication credential from recipient for the online social network and the method further comprises: periodically using the recipient background information to access the online social network and retrieving an online social network data as recipient background information; storing recipient background information in a database and associating the recipient background information with a recipient contact in the database whereby the recipient background information can be retrieved on the basis of an email characteristic; comparing the recipient background information to the email characteristic comprises: finding the recipient contact by matching an email characteristic to the recipient background information retrieved from the online social network, and comparing the recipient background information of the recipient contact to the email characteristics of the received email; and determining legitimacy of the email sender based on the comparison of the recipient background information of the recipient contact to the email characteristics of the received email. In some embodiments, the step of finding the recipient contact by matching an email characteristic to the recipient background information retrieved from the online social network comprises at least one of the methods selected from the group consisting of: finding the recipient contact by matching a sender email name to a contact name in the recipient background information retrieved from the online social network of the recipient; finding the recipient contact by matching a sender email address to a contact email address in the recipient background information retrieved from the online social network of the recipient; and finding the recipient contact by matching the sender email address to a domain name associated with one of a contact place of employment or places of education in the background information of the recipient obtained from the online social network of the recipient. In some embodiments, the step of comparing the recipient background information of the recipient contact to the email characteristics of the received email comprises at least one of methods comprising: comparing the email characteristic of the language used in the received email message to a language indicated as spoken by the recipient contact in the recipient background information, determining a physical location of where the received email message was sent from by cross referencing an IP address of the sent email against a GeoIP database and comparing this location against the physical location of the contact or phone number area code or place of employment or place of education as specified in the recipient background information and determining a quality of a relationship between the recipient and the recipient contact by evaluating the recipient background information obtained from the online social network. In some embodiments, the step of determining a quality of a relationship between the recipient and the recipient contact by evaluating the recipient background information obtained from the online social network comprises one or more recipient background information selected from the group consisting of: a length of time recipient contact has spent on the online social network; a length of time recipient contact and recipient have known each other; a number of other contacts both recipient contact and recipient share in common; a number of groups recipient contact and recipient participate in together; a number of places of work, education shared by recipient contact and recipient; a number of received email messages recipient contact and recipient have shared; and a number of online social network the recipient contact and recipient are connected on.

In some embodiments, the recipient background information comprises a social network data and a third party authentication credential from the recipient for the online social networks. For example, the third party authentication credentials may include authentication credentials for one or more third party social networks such as Facebook, LinkedIn, Google+ and the like. In some embodiments, the online social network data comprises one selected from the group consisting of: a contact; a contact identifier; a contact name; an email address; a phone number; an educational affiliation; employment data; a residence and work address; a language spoken; a date when the recipient contact became related to the recipient on the online social networks; a number of online social networks the recipient contact and the recipient are connected on; a date when the recipient contact joined the online social networks; a number of messages recipient contact and recipient have exchanged; a number of other contacts that recipient contact and recipient are both related to; and a groups the recipient contact and the recipient share in common.

Figure 4:
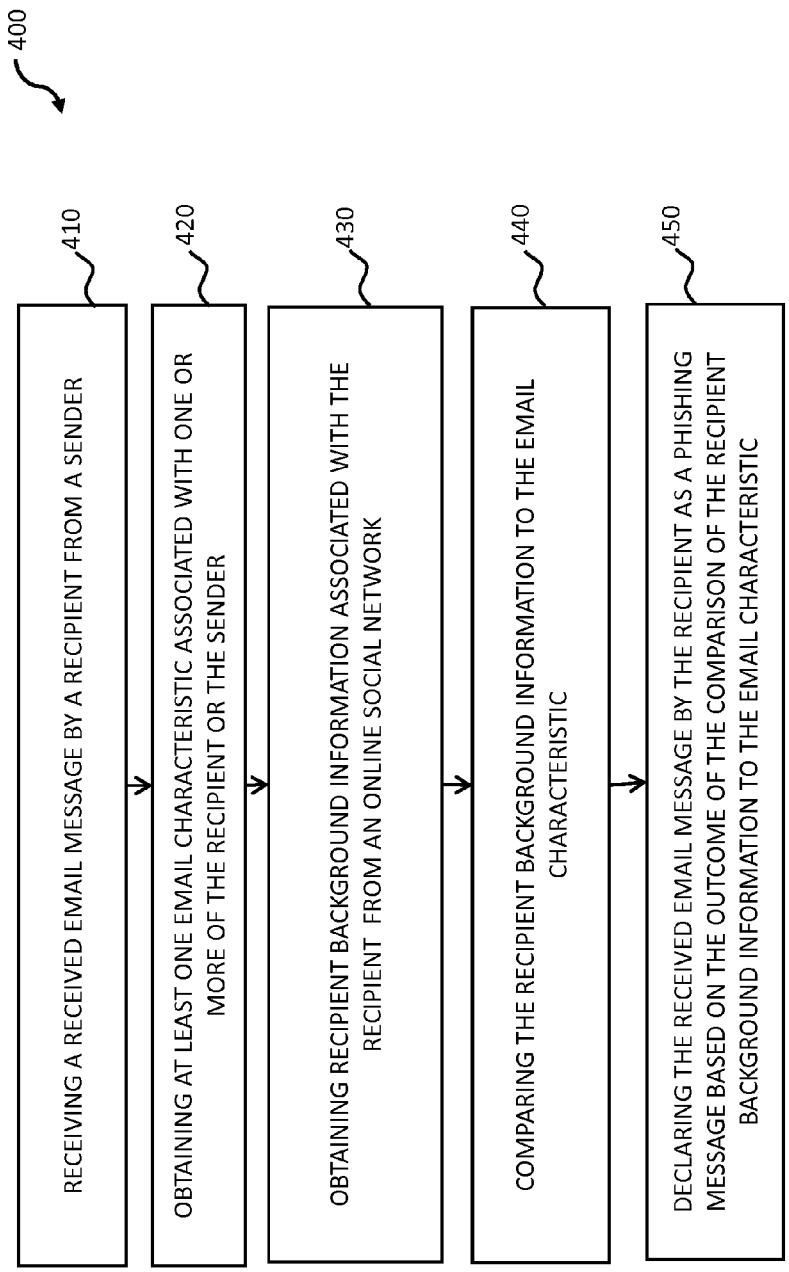
FIG. 4 illustrates a flow diagram of an example method for analyzing electronic messages.

An illustration of one embodiment of FIG. 4 can be provided using the recipient contacts as one of the recipient background information. In this example, at 440, the email senders name and email address are compared to the social network contacts available of the receiver. The relevant contact is found by comparing email senders name against the names of contacts retrieved from recipient social networks or by comparing email senders email address against the email address of contacts retrieved from recipient online social networks or by comparing email senders email address against the domain names associated with the contacts places of employment and/or places of education or any other such method that is made available by the data retrieved from the social network. Once the contact is found various tests are conducted to compare email characteristics against the social network properties of the contact including comparing the language used in the email to languages indicated as those spoken by the contact, or determining the physical location of where the email was sent from by cross referencing the IP address of the sent email against a GeoIP database and subsequently comparing this location against the physical location of the contact or phone number area code or place of employment or place of education as specified in the social network, or determining the quality of the relationship between the email recipient and the contact by evaluating background information obtained from the social networks such as the length of time contact has spent on the social network, length of time contact and email recipient have known each other, number of other contacts both contact and user share in common, number of groups contact and user participate in together, number of places of work, education shared by contact and user, number of message contact and email recipient have shared, number of social networks contact and email recipient are connected on and the like.

In some embodiments, the methods further comprise comparing the email characteristic of the received email message with the email characteristics associated with one or more of the recipient or the sender and declaring the received email message by the recipient as the phishing message based on the outcome of the comparison of the recipient background information to the email characteristic and the outcome of the comparison of the email characteristic of the received email message with the email characteristic associated with one or more of the recipient or the sender. For example, one embodiment comprises retrieving recipient background information for a hypothetical recipient Dagny Taggart—dtaggart@taggarttc.com—from her online social networks. Upon receiving a new email message from a hypothetical sender—John Smith—jsmith@jsmithco.com—not only is the recipient background information obtained (in real time or in the past) from the social networks of Dagny Taggart compared against the email data associated with John Smith, but the email characteristics of the new received email message are compared with email characteristics of emails sent by John Smith to Dagny Taggart in the past. For example, John Smith's profile on a social network may indicate his address as one in California. Additionally all emails sent by John Smith to Dagny Taggart in the past have been sent using a Comcast connection on an IPhone. If all three of these characteristics compare positively the likelihood of the email being a phish would be reduced.

In some embodiments, the methods further comprise the recipient belonging to an recipient organization having at least one other recipient in the recipient organization and the recipient background information associated with the recipient comprises one of the recipient background information associated with the recipient or the recipient background information associated with the other recipient in the recipient organization.

In some embodiments, the online social network comprises one of a first online social network of the recipient or a second online social network of the other recipient.

In some embodiments, the methods further comprise importing a plurality of received email messages received by the recipient over a predetermined time interval, obtaining a plurality of email characteristics of the imported received email messages by parsing the recipient received email message based on a predetermined email characteristic and storing the email characteristics associated with the recipient and the sender received email messages in a database.

In some embodiments, the methods further comprise: applying a text classification engine to the email characteristics to define an email characteristic profile; receiving a new received email message; applying the text classification engine to the new received email message to define a new received email message profile; comparing the new received email message profile to the email characteristic profile to determine whether the new received email message profile is similar to the email characteristic profile; and determining whether the new received email message is the phishing message based on the outcome of the comparison. In some embodiments, the methods further comprise: storing the email characteristics in a database and grouping the email characteristics into a first group and a second group; the first group comprising the email characteristics of a plurality of received email messages selected based on a name of the sender, an email address of the sender and a names and email addresses of the recipients of the received email message; the second group comprising the email characteristics of the plurality of received email messages selected based on the name of the sender and the email address of the sender of the received email message; training a text classification engine to the email characteristics comprises applying a text classification engine to the first and second group of email characteristics to create a first group email characteristic profile and a second group email characteristic profile; and comparing the new received email message profile to the email characteristic profile comprises comparing the new received email message profile to at least one of the first group email characteristic profile and the second group email characteristic profile.

In some embodiments, the methods further comprise: storing the received email message characteristics in a database; grouping the received email message characteristics into a plurality of pattern groupings, each pattern grouping being defined by a pattern characteristic; storing the pattern groupings in a database along with a count of received email messages with the email characteristics that place it in the pattern grouping; receiving a new received email message; comparing the email characteristics of the new received email message with the pattern characteristics; and declaring the new received email message by the recipient as the phishing message based on the outcome of the comparison. In some embodiments, the pattern groupings comprise at least one of the group consisting of: a sender and recipient group pattern representing the email characteristics of the sender and the recipient; a sender and recipient organization group pattern representing the email characteristics associated with the sender and an organization of the recipient; a sender organization and recipient group pattern representing the email characteristics associated with an organization of the sender and the recipient; a sender organization and recipient organization group pattern representing the email characteristics associated with the organization of the sender and the organization of the recipient; a sender organization group pattern representing the email characteristics associated with the organization of the sender organization; and a sender group pattern representing the email characteristics associated with the sender. In some embodiments, the step of storing the pattern groupings in a database along with a count of received email messages with the email characteristics that place it in the pattern grouping comprises storing the pattern groupings in a database along with one or more of the count or a chronology of received email messages with the email characteristics that place it in the pattern grouping.

In some embodiments, comparing the recipient background information to the email characteristic comprises: obtaining the email characteristic associated with one or more of the recipient or the sender along with a statistical distribution of the email characteristics; and comparing the email characteristics of the received email message with the obtained email characteristics associated with one or more of the recipient or the sender that are similar to the new received email message characteristic that has a high statistical distribution.

In some embodiments, the methods may further comprise parsing outbound emails sent by the recipient based on a set of predetermined email characteristics to determine if the outbound email is a response or a forward of a previously received email message by the recipient, updating the database based on the above determination to indicate that the characteristics of the previously received email are more likely to represent a legitimate sender, comparing ongoing emails received from the sender with stored email characteristics and declaring any of the ongoing emails received from the sender as the phishing message based on the outcome of the comparison.

Figure 5A:
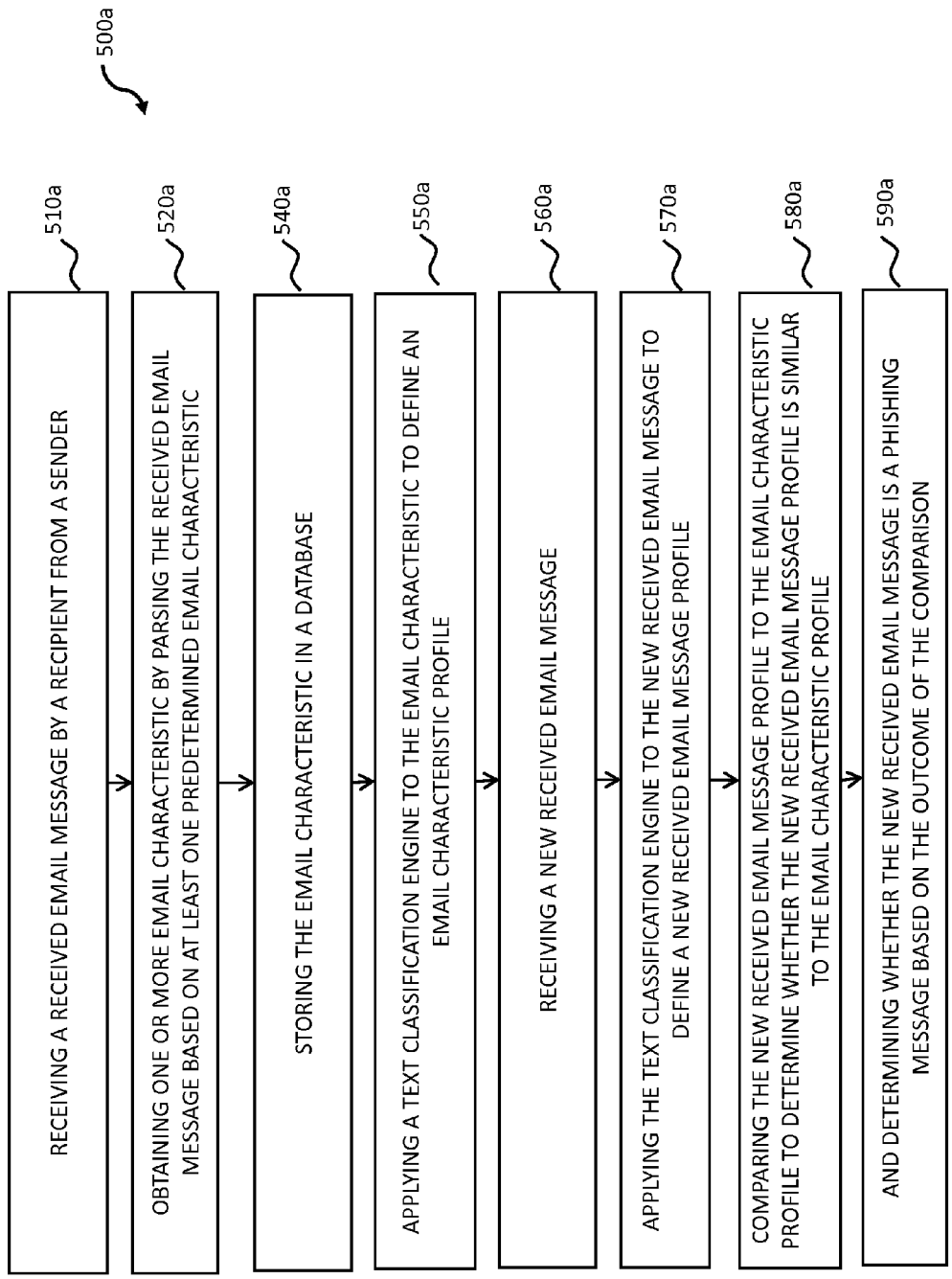
FIG. 5A illustrates a flow diagram of an example method for analyzing electronic messages.

FIG. 5A illustrates one example embodiment of a computer implemented method for analyzing electronic messages for phishing detection may utilize email message profiles to help determine whether the new received email message is a phishing message. One example embodiment of this method 500a comprises: receiving a received email message by a recipient from a sender at 510a; obtaining one or more email characteristic by parsing the received email message based on at least one of a set of predetermined email characteristics at 520a; the email characteristic comprising one or more of a sender email characteristic or a recipient email characteristic; storing the email characteristic in a database at 540a; applying a text classification engine to the email characteristic to define an email characteristic profile at 550a; receiving a new received email message at 560a; applying the text classification engine to the new received email message to define a new received email message profile at 570a; comparing the new received email message profile to the email characteristic profile to determine whether the new received email message profile is similar to the email characteristic profile at 580a; and determining whether the new received email message is a phishing message based on the outcome of the comparison at 590a. In some embodiments, applying a text classification engine to the email characteristics comprises applying a text classification engine to a first and a second group of email characteristics to create a first group email characteristic profile and a second group email characteristic profile; and comparing the new received email message profile to the email characteristic profile comprises comparing the new received email message profile to at least one of the first group email characteristic profile and the second group email characteristic profile. In some embodiments, storing the email characteristics in a database further comprises grouping the email characteristics into a first group and a second group; the first group comprising the email characteristics of a plurality of received email messages selected based on a name of the sender, an email address of the sender and a name and email address of the recipient of the received email message; the second group comprising the email characteristics of the plurality of received email messages selected based on the name of the sender and the email address of the sender of the received email message; applying a text classification engine to the email characteristics comprises applying a text classification engine to the first and second group of email characteristics to create a first group email characteristic profile and a second group email characteristic profile; and comparing the new received email message profile to the email characteristic profile comprises comparing the new received email message profile to at least one of the first group email characteristic profile and the second group email characteristic profile. In some embodiments, the email characteristics comprise the content of the received email message and the new received email message. In some embodiments, the methods may further comprise accruing a minimum number of received email messages in each group; storing the results of the training; updating the training of an algorithm in the text classification engine with the new received email message characteristics.

One example embodiment illustrating the methods of FIG. 5A comprises receiving emails from a hypothetical sender—John Smith—jsmith@jsmithco.com to a hypothetical recipient Dagny Taggart—dtaggart@taggarttc.com. In this example the email data would be broken into email characteristics such as the quality of words utilized, the amount of whitespace and punctuation characters, the character case and others. The text classification engine would then build two profiles based on these characteristics one for all emails received in the system from John Smith—jsmith@jsmithco.com regardless of the recipient and the other characteristic profile for emails from John Smith—jsmith@jsmithco.com to Dagny Taggart—dtaggart@taggarttc.com. Upon receiving a new message from John Smith the text classifier would break the new email into similar characteristics—build a profile of these characteristics and then compare the profile of the new received message to the previously created profiles to assess if the emails writing style was similar to the other emails received from John Smith.

Figure 5B:
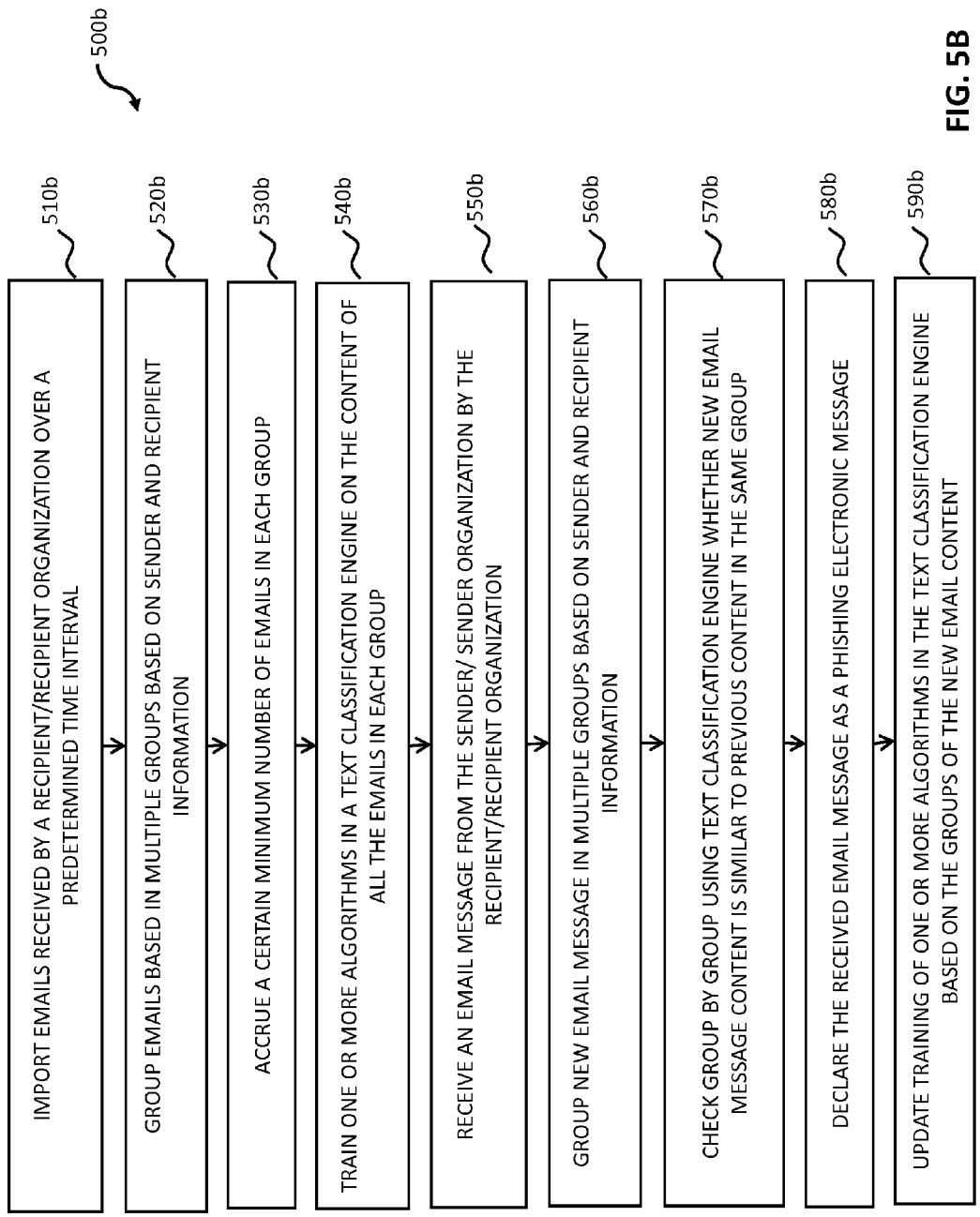
FIG. 5B illustrates a flow diagram of an example method for analyzing electronic messages.

FIG. 5B illustrates one example embodiment of the methods for electronic message analysis utilizing email message profiles. FIG. 5B illustrates a flow diagram of method 500b for carrying out analysis of electronic messages for phishing detection.

Now, referring to FIG. 5B, at block 510b, emails received by the recipient/recipient organization over a predetermined time interval are imported.

At block 520b, each email is grouped into multiple groups: first group based on the emails Sender Name, Sender Email Address, and the email addresses of the Recipients on the email and the second based just on emails Sender Name, Sender Email Address email.

At block 530b, emails are accrued in each group until a certain minimum threshold of emails are present.

At block 540b, one or more algorithms such as Neural Nets, Hidden Markov Models and the like are trained using a text classification engine on the contents of the emails in each group. This training serves the purpose of teaching the text classification engine to find commonalities in each group that can be used to compare future emails to ascertain if they truly belong to the group. Different algorithms have different levels of success thus one or more algorithms are trained on each group.

At block 550b, an email message is received from a sender/sender organization for a recipient/recipient organization.

At block 560b, the new email is grouped into multiple groups: first group based on the emails Sender Name, Sender Email Address, and the email addresses of the Recipients on the email and the second based just on emails Sender Name, Sender Email Address email.

At block 570b, the text classification engine checks each algorithm trained on the groups associated with the new email against the content of the new email to determine if the new email shares commonalities with the other emails in its groups. Depending upon the determination at block 580b the email is deemed to be a phishing message.

At block 590b, the training of each algorithm in the text classification engine is updated with the contents of the new email.

Figure 6A:
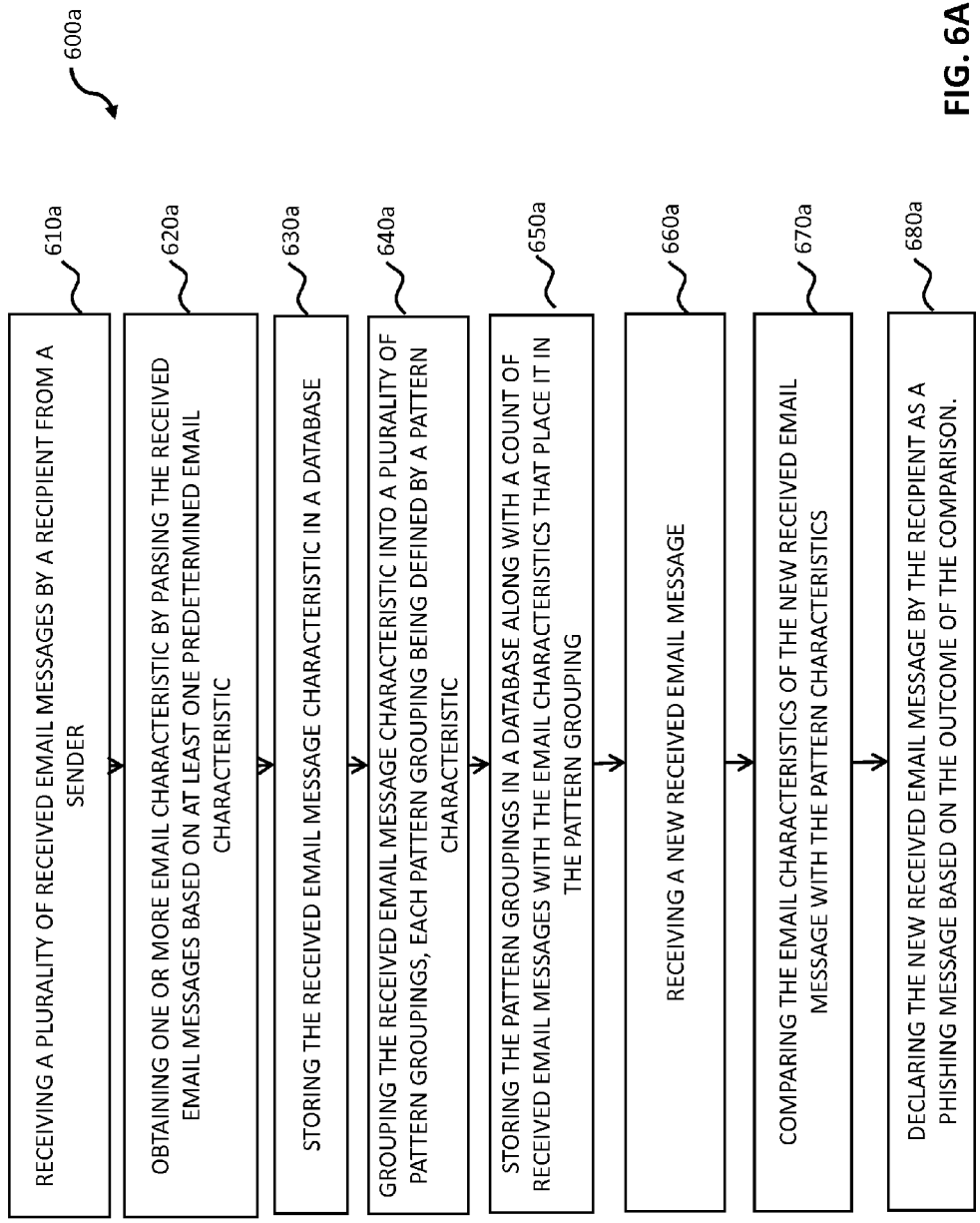
FIG. 6A illustrates a flow diagram of an example method for analyzing electronic messages.

FIG. 6A illustrates one example embodiment of a computer implemented method for analyzing electronic messages for phishing detection may utilize pattern groupings to help determine whether the new received email message by the recipient as a phishing message. In one example embodiment, the method 600a comprises receiving a plurality of received email messages by a recipient from a sender at 610a, obtaining one or more email characteristic by parsing the received email messages based on at least one of a set of predetermined email characteristics at 620a, storing the received email message characteristic in a database at 630a, grouping the received email message characteristic into a plurality of pattern groupings at 640a, each pattern grouping being defined by a pattern characteristic, storing the pattern groupings in a database along with a count of received email messages with the email characteristics that place it in the pattern grouping at 650a, receiving a new received email message at 660a, comparing the email characteristics of the new received email message with the pattern characteristics at 670a and declaring the new received email message by the recipient as a phishing message based on the outcome of the comparison at 680a. In some embodiments, storing the pattern groupings in a database along with a count of received email messages with the email characteristics that place it in the pattern grouping comprises storing the pattern groupings in a database along with one or more of a count or a chronology of received email messages with the email characteristics that place it in the pattern grouping. In some embodiments, comparing the email characteristics of the new received email message with the pattern characteristics further comprises: grouping the new received email message into a plurality of pattern groups; comparing the new received email message characteristics to the email characteristics present in each pattern group; and scoring the new received email message based upon the pattern groups it is grouped into. Some embodiments further comprise updating the database with data reflecting the pattern characteristics of the new received email message. Some embodiments further comprise formulating a confidence score for each pattern grouping based upon a count of received email messages in the pattern grouping, formulating a newness score for each pattern grouping indicating a duration of time for which the pattern grouping has been an active pattern grouping and the pattern characteristics further comprise the confidence score and the newness score. In some embodiments, the pattern groupings comprise a pattern grouping of email characteristics associated with the sender and the recipient. In some embodiments, the pattern groupings comprise at least one of the group consisting of: a sender and recipient group pattern representing the email characteristics of the sender and the recipient; a sender and recipient organization group pattern representing the email characteristics associated with the sender and an organization of the recipient; a sender organization and recipient group pattern representing the email characteristics associated with an organization of the sender and the recipient; a sender organization and recipient organization group pattern representing the email characteristics associated with the organization of the sender and the organization of the recipient; a sender organization group pattern representing the email characteristics associated with the organization of the sender organization; and a sender group pattern representing the email characteristics associated with the sender. In some embodiments, the email characteristic comprises at least one email characteristic selected from an email data from the received email message.

One example embodiment illustrating the methods of FIG. 6A comprises receiving emails from a hypothetical sender—John Smith—jsmith@jsmithco.com to a hypothetical recipient Dagny Taggart—dtaggart@taggartc.com. Email characteristics such as John's sending IP address, IP address cross referenced with a GeoIP database to determine Johns location in the world, the server information used by John's email provider and other such email data are then obtained from the messages either directly or by cross referencing other databases, software systems. These characteristics are stored in the database. Commonly occurring characteristics are stored in the database in pattern groupings. So for instance, John typically sends email to Dagny only in the time period of 8 AM-12 PM in the East coast time zone. Or John normally uses an IPhone to send email along with data service provided by ATT otherwise he uses gmail with a server located on the east coast. Along with the patterns, data is also stored regarding the frequency of emails sent by John adhering to each pattern. Patterns are also created for the Company where John works as well as the company where Dagny works. When new emails are received those emails are broken down into characteristics and those characteristics values are used to check the existence of a previously used pattern for each possible pattern grouping. If a pattern grouping is found that has been used regularly for a certain length of time the likelihood of the email being phishing is reduced.

FIG. 6B illustrates one example embodiment of the methods for electronic message analysis utilizing pattern groupings. FIG. 6B illustrates a flow diagram of method 600b for carrying out analysis of electronic messages for phishing detection.

Now, referring to FIG. 6B, at block 610b, emails received by the recipient/recipient organization over a predetermined time interval are imported.

At block 620b, email characteristics of the imported emails are obtained by parsing the recipient's/recipient organization's received emails. Characteristic groupings called Patterns are then created based on email characteristic values present in a specific email that are likely to be present in other emails and pre-assigned characteristic data that place each characteristic into one or more of the following groups—Sender and Recipient—representing the email characteristics that are associated with the sender and the recipient, Sender and Recipient Organization—representing the email characteristics that are associated with the sender and the recipients organization, Sender Organization and Recipient—representing the email characteristics that are associated with the senders organization and the recipient, Sender Organization and Recipient Organization—representing the email characteristics that are associated with the sender organization and the recipient organization, Sender Organization—representing the email characteristics that are associated with the sender organization and the Sender—representing the email characteristics that are associated with the sender.

At block 630b, Patterns are created or updated in the database along with metrics regarding such as the count, frequency, date and time of emails conforming to a Pattern. At block 640b, based upon the number of patterns for each unique value of Sender and Recipient, Sender and Recipient Organization, Sender Organization and Recipient, Sender Organization and Recipient Organization, Sender Organization, Sender groups and the metrics corresponding to each pattern a confidence score and a newness score are created At block 650b, an email message is received from a sender/sender organization for a recipient/recipient organization.

At block 660b, email characteristics of the received emails are obtained by parsing the recipient's/recipient organization's received emails. Patterns associated with the Sender/Sender Organization and/or Recipient/Recipient Organization are compared against the received emails characteristics. If a determination is made that the received emails characteristics are similar to a pre-existing pattern associated with the Sender/Sender Organization and/or Recipient/Recipient Organization then the credibility and newness score of the most appropriate pattern is used to determine that the new email is a phishing email.

At block 670b, the received email message by the recipient/recipient organization is declared as a phishing electronic message based on the outcome of the comparison.

At block 680b, the email characteristics of the received email are used to update the pattern/its metrics or to create new pattern.

In various examples, system and method described in FIGS. 1-8 propose techniques for carrying out analysis of electronic message for phishing detection. In some embodiments, the methods further comprise the addition of an indicator to emails to visually indicate to users that an email may be a phishing attempt. Additionally, the methods may notify an organization's computer system administrators regarding any synchronized attacks targeting multiple of their users by identifying any found patterns in incoming emails. Furthermore, the methods may alert an organization's computer system administrators about any possible security compromises that may result in phishing attacks within the organization. Furthermore, the methods may alert an organization's system administrators about possible responses to phishing email messages with the capability to prevent such response from being delivered to the phisher. In addition, the methods may assist in determining any coordinated phishing attacks against an organization by determining phishing attacks with similar characteristics against multiple users of that organization. In addition, the methods may, as described in above, use an outbound email reply as a trust factor for the sender/sender organization of the original email in determining the phishing nature of a received email from the sender/sender organization. Also, the above methods may use changing patterns of outbound emails to help determine whether an email client has been compromised and a sender/sender organization is sending any phishing email. Moreover, the above methods may allow users to specify an email as a phishing attempt or a legitimate email and use the characteristics of the flagged email to filter messages to other users at that organization.

In some embodiments, a method for analyzing electronic messages for phishing message detection, comprises receiving a received email message having a plurality of email characteristics, the email characteristics comprising a Reply-To email address and a recipient address, determining whether the received email message by the recipient to be a questionable phishing message, changing the Reply-To email address to a custom email address if the received email message is the questionable phishing message, allowing the received email message to be delivered to the recipient address, receiving a reply email message from the recipient address at the custom email address, inspecting the reply email message from the recipient to determine whether the questionable phishing message is a phishing message, quarantining the reply email message or forwarding the replay email for manual inspection if the questionable phishing message is the phishing message and delivering the reply to the original Reply-To email address if the questionable phishing message is not the phishing message. A questionable phishing message may comprise a received email message having some email characteristics consistent with a phishing message but not all email characteristics consistent with a phishing message. In some embodiments, a threshold of email characteristics is used to determine whether a received email message is not a phishing message, a questionable phishing message or phishing message. In some embodiments, the inspection of the reply email message is done with a manual inspection by particular users.

The elements of the above systems may be combined in any manner to support the methods disclosed herein.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

One Example Embodiment of a System for Electronic Message Analysis:

One example embodiment of a system for electronic message analysis generally comprises the elements of FIG. 1 in a software program product to be executed by a computer implemented system.

As will be readily apparent to those skilled in the art, system for electronic message analysis can be embodied in hardware, software, or a combination of hardware and software. For example, a computer system or server system, or other computer implemented apparatus combining hardware and software adapted for carrying out the methods described herein, may be suitable. One embodiment of a combination of hardware and software could be a general purpose computer system with a computer program that, when loaded and executed, carries out the respective methods described herein. In some embodiments, a specific use computer, containing specialized hardware for carrying out one or more of the instructions of the computer program, may be utilized. In some embodiments, the computer system may comprise a device such as, but not limited to a digital phone, cellular phone, laptop computer, desktop computer, digital assistant, server or server/client system.

Computer program, software program, program, software or program code in the present context mean any expression, in any language, code or notation, of a set of instructions readable by a processor or computer system, intended to cause a system having an information processing capability to perform a particular function or bring about a certain result either directly or after either or both of the following: (a) conversion to another language, code or notation; and (b) reproduction in a different material form. A computer program can be written in any form of programming language, including compiled or interpreted languages, and it can be deployed in any form, including as a stand-alone program or as a module, component, subroutine, or other unit suitable for use in a computing environment.

Figure 8:
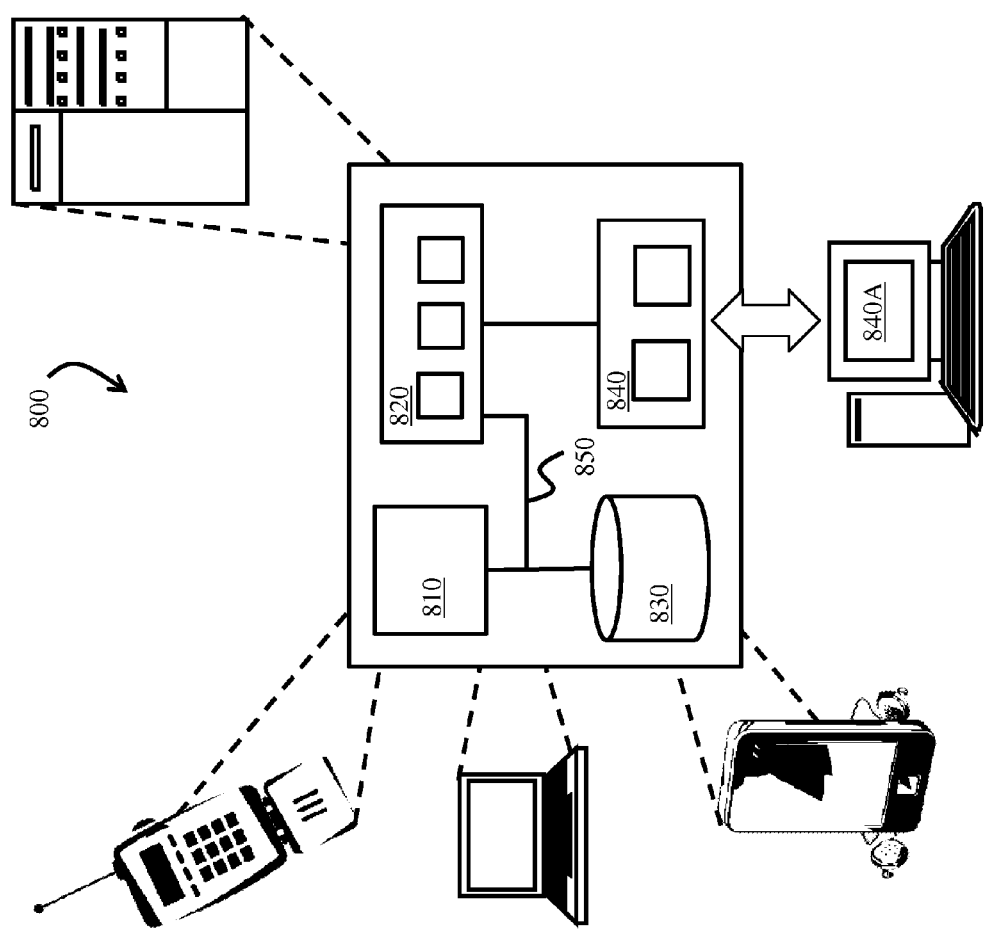
FIG. 8 illustrates an example block diagram of a system for analyzing electronic messages for phishing detection.

FIG. 8 is a schematic diagram of one embodiment of a computer system 800 by which the methods for electronic message analysis may be carried out. The computer system 800 can be used for the operations described in association with any of the computer implemented methods described herein. The computer system 800 includes at least one processor 810, a memory 820 and an input/output device 840. Each of the components 810, 820, and 840 are operably coupled or interconnected using a system bus 850. The computer system 800 may further comprise a storage device 830 operably coupled or interconnected with the system bus 850.

The processor 810 is capable of receiving the instructions and/or data and processing the instructions of a computer program for execution within the computer system 800. In some embodiments, the processor 810 is a single-threaded processor. In some embodiments, the processor 810 is a multi-threaded processor. The processor 810 is capable of processing instructions of a computer stored in the memory 820 or on the storage device 830 to communicate information to the input/output device 840. Suitable processors for the execution of the computer program instruction include, by way of example, both general and special purpose microprocessors, and a sole processor or one of multiple processors of any kind of computer.

The memory 820 stores information within the computer system 800. Memory 820 may comprise a magnetic disk such as an internal hard disk or removable disk; a magneto-optical disk; an optical disk; or a semiconductor memory device such as PROM, EPROM, EEPROM or a flash memory device. In some embodiments, the memory 820 comprises a transitory or non-transitory computer readable medium. In some embodiments, the memory 820 is a volatile memory unit. In other embodiments, the memory 820 is a non-volatile memory unit.

The processor 810 and the memory 820 can be supplemented by, or incorporated in, ASICs (application-specific integrated circuits).

The storage device 830 may be capable of providing mass storage for the system 800. In various embodiments, the storage device 830 may be, for example only and not for limitation, a computer readable medium such as a floppy disk, a hard disk, an optical disk, a tape device, CD-ROM and DVD-ROM disks, alone or with a device to read the computer readable medium, or any other means known to the skilled artisan for providing the computer program to the computer system for execution thereby. In some embodiments, the storage device 830 comprises a transitory or non-transitory computer readable medium.

In some embodiments, the memory 820 and/or the storage device 830 may be located on a remote system such as a server system, coupled to the processor 810 via a network interface, such as an Ethernet interface.

The input/output device 840 provides input/output operations for the system 800 and may be in communication with a user interface 840A as shown. In one embodiment, the input/output device 840 includes a keyboard and/or pointing device. In some embodiments, the input/output device 840 includes a display unit for displaying graphical user interfaces or the input/output device 840 may comprise a touchscreen. In some embodiments, the user interface 840A comprises devices such as, but not limited to a keyboard, pointing device, display device or a touchscreen that provides a user with the ability to communicate with the input/output device 840.

The computer system 800 can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, wireless phone networks and the computers and networks forming the Internet.

A functional diagram of one embodiment of the computer program capable of executing the described methods is shown in the functional diagram in FIG. 1.

One example embodiment of the systems and methods for electronic message analysis may be embodied in a computer program product, the computer program product comprising a computer readable medium having a computer readable program code tangibly embodied therewith, the computer program code configured to implement the methods described herein, and which, when loaded in a computer system comprising a processor, is able to carry out these methods.

Example Embodiments of Systems for Electronic Message Analysis in Operation:

Now, the operation of the system 100 will be described as an illustration of one embodiment of the system in operation. The one or more recipients/recipient organization receives an email message from one or more senders/sender's organization via the mail handler module 173. The analysis and data warehouse module then obtain email characteristics by parsing the received email message based on a set of predetermined email characteristics.

Examples of email characteristics comprise such characteristics as the network path used to reach a recipient/recipient organization, geography associated with IP address, email client software used by the sender/sender organization, email client software version used by the sender/sender organization, date, day of week, time, time period of the email, time zone of the sender/sender organization, presence and details of digital signatures in the email, meta data present in header portion of the email, character set used in content of the email, format of the email, email length and subject length, character case of the email, character case of the subject, style of introduction at the top of the email, style and content of the sender/sender organization's signature in the body of the email, other recipient's included in the email, to, and copy circulated (cc'd) email addresses, senders name, sender's from and reply to email address, sender's organization name, senders domain name, sender's organization's Domain Name Service (DNS) settings including SPF records, sender organization's mail server information, including server ip address, sender server network path, sender email server software and software version, DKIM signature, spam scoring from spam software, message ID, volume of email sent by the sender, volume of email sent by sender's organization, volume of email received by the recipient, volume of email received by recipient organization, details associated with URLs or attachments in the email, whether the recipient/recipient organization has responded to this specific email, and number of interactions between sender/sender organization and recipient associated with the email and the like.

Further, in operation, emails received by the recipient/recipient organization over a predetermined time interval may be imported by the import module 171 on its own or optionally via the email client plugin module 131. The analysis and data warehouse module 172 then parses the recipient/recipient organization's received emails based on the set of predetermined email characteristics to obtain email characteristics of the imported emails. The analysis and data warehouse module 172 then stores the obtained email characteristics associated with recipient/recipient organization and sender/sender organization in the database 180.

Furthermore, in operation, the configuration and management module is configured to allow an administrator to select desired email characteristics to be included in the set of characteristics used for comparing the characteristics of the received email message and to assign or change a weight of how much each characteristic should influence the likelihood that a new message is a phishing message.

Now, during operation, the analysis and data warehouse module 172 compares email characteristics of the received email message with email characteristics associated with the recipient/recipient organization and/or from that sender/sender organization by the analysis and data warehouse module. In some embodiments, the analysis and data warehouse module 172 obtains a statistical distribution of each of the stored email characteristics associated with the recipient/recipient organization for a sender/sender organization. The analysis and data warehouse module 172 then compares the email characteristics of the received email message with email characteristics associated with the recipient/recipient organization for that sender/sender organization having high statistical distribution.

The analysis and data warehouse module 172 then scores and declares the received email message by the recipient/recipient organization as a phishing electronic message based on the outcome of the comparison.

In some embodiments, the analysis and data warehouse module 172 determines a degree of variance of each email characteristic when compared with the recipient/recipient organization for that sender/sender organization having high statistical distribution. The analysis and data warehouse module 172 then establishes a score based on the determined degree of variance for each email characteristic, wherein the analysis and data warehouse module 172 assigns weights for each established score based on the determined degree of variance. The analysis and data warehouse module 172 then obtains a combined score by adding scores of all the email characteristics in the received email based on the assigned weights.

In some embodiments, the analysis and data warehouse module 172 stores logs of received emails and any associated phishing activity along with details of why the email was determined to be a phishing email in the database. The configuration and management module 176 may then output logs of received emails and any associated phishing activity for viewing on a display device.

In some embodiments, the mail handler module 173 quarantines emails determined to be phishing emails. In these embodiments, the configuration and management module 176 may then output quarantined emails for viewing on a display device or forwards these emails to certain users or adds certain text to the header or subject of the email to mark them as suspect or questionable phishing messages.

In some embodiments, either the email client plugin module 131 or the outbound mail relay module 175 parses outbound emails sent by the recipient/recipient organization based on predetermined outbound email characteristics to determine if the outbound email is a response or forward of a previously received email by the recipient/recipient organization. The analysis and data warehouse module 172 then updates email characteristics of the previously received emails based on the above determination to determine that the characteristics of previously received email are more likely to represent a legitimate sender/sender organization. The analysis and data warehouse module 172 then compares ongoing emails received from the sender/sender organizations with the email characteristics, and wherein the analysis and data warehouse module scores and declares any of the ongoing emails received from sender/sender organizations as phishing based on the outcome of the comparison.

In some embodiments, either the mail handler module 173 or the email client plugin module 131 includes visual identifications and reasoning information to the received email based on the outcome of the comparison to assist the recipient/recipient organization of the nature of the received email.

In some embodiments, either the email client plugin module 131 or the configuration and management module 176 obtains recipient background information from the email recipient/recipient organizations' online social networks. The analysis and data warehouse module 172 then associates the recipient background information such as recipient contacts to email characteristics associated with the recipient or the sender such as past email addressees and stores the resultant recipient background information in the database. The analysis and data ware house module 172, upon receiving an email, determines whether the email characteristics of the new received email message match the recipient background information in the database 180. The analysis and data warehouse module 172 then scores and declares the received email as a phishing email based on the outcome of the determination.

In some embodiments, the organization analysis data warehouse module 172 determines coordinated phishing attacks against an organization by spotting phishing attacks having similar characteristics against multiple users in the organization. In some embodiments, the organization analysis module 174 monitors changing patterns of outbound emails to determine whether an organization's email client has been compromised and the sender/sender organization is sending a phishing email. In some embodiments, either the email client plugin module 131 or the configuration and management module 176 allows users to specify an email as a phishing attempt or a legitimate email and use the characteristics of this flagged email to filter messages to other users in the organization.

In one embodiment, a system for analyzing electronic messages for phishing message detection comprises a system similar to that illustrated in FIG. 1 configured to execute the methods of electronic message analysis utilizing email characteristics. In this embodiment, the methods generally comprise receiving an email message from one or more sender by one or more recipients via the mail handler module, obtaining an email characteristic by parsing the received email message based on a set of predetermined email characteristics by the analysis and data warehouse module, comparing one or more of the email characteristic of the received email message with an email characteristic associated with one or more of the recipient or the sender by the analysis and data warehouse module, declaring the received email message by the recipient as a phishing message based on the outcome of the comparison by the analysis and data warehouse module and storing the email message characteristic associated with one or more of the recipient or the sender in a database. In this embodiment, the configuration and management module allows an administrator to select the email characteristics to be included in the predetermined email characteristics used for comparing the email characteristics of the received email message and to assign a weight of how much each email characteristic should influence the likelihood that a new message is a phishing message. In some embodiments, the methods further comprise one of the import module or the email client plugin module directly imports emails received by the recipient over a predetermined time interval, the analysis and data warehouse module parses the recipient received emails based on the predetermined email characteristics to obtain email characteristics of the imported emails and the analysis and data warehouse module stores the obtained email characteristics associated with one or more of the recipient or sender received email message in the database. In some embodiments, the methods further comprise: one of the import module or the email client plugin module directly imports received email messages received by the recipient over a predetermined time interval; the analysis and data warehouse module groups the new received email messages into a first group based on the emails Sender Name, Sender Email Address, and the email addresses of the Recipients on the email and a second group based just on emails Sender Name, Sender Email Address, wherein the analysis and data warehouse module accrues a certain minimum number of emails in each group; the text classification module performs training using one or more algorithms on the email data of the emails in each group; the analysis and data warehouse module store the result of the training; upon receipt of a new email the analysis and data warehouse module parse the new email, grouping it into one of the first or second group; the text classification module checks each trained algorithm to determine whether the new email is written in a similar style as the other emails belonging to the first or the second group; the analysis and data warehouse module use the outcome to influence the likelihood that the new message is the phishing message; the text classification module updates the training of each algorithm in the test classification engine for the specified groups with the contents of the new email; and the analysis and data warehouse module stores the updated results of the training. In some embodiments, the methods further comprise: one of the import module or the email client plugin module directly imports emails received by the recipient over a predetermined time interval; the analysis and data warehouse module groups the new received email message into groupings called patterns that are based on email characteristic values present in a specific received email message that are likely to be present in other received email message and pre-assigned email characteristic data that place each email characteristic into one or more of the following patterns: Sender and Recipient, Sender and Recipient Organization, Sender Organization and Recipient, Sender Organization and Recipient Organization, Sender Organization, and Sender; the analysis and data warehouse stores patterns in the database along with information regarding the count of emails with characteristics that place it in a specific group as well as the dates on which emails belonging to a group were received; the analysis and data warehouse module formulates a confidence score for each pattern based upon the number of emails received conforming to a pattern; the analysis and data warehouse module formulates a newness score for each pattern indicating the duration of time for which the pattern has been active; upon the receipt of a new email the analysis and data warehouse module determines if it belongs to a pre-existing pattern or requires the creation of a new pattern; the analysis and data warehouse module scores the email based upon the pattern its characteristics match if any, and the patterns confidence and newness scores; the analysis and data warehouse module uses the outcome to influence the likelihood that the new message is the phishing message; and the analysis and data warehouse module update the database with data reflecting the pattern, characteristics and appearance of the new received email message. In some embodiments, the methods further comprise: the analysis and data warehouse module obtains stored email characteristics associated with one or more of the recipient or the sender along with their statistical distribution and the analysis and data warehouse module compares one or more of the email characteristics of the received email message with the obtained email characteristics associated with the one or more of the recipient or the sender that are similar to the new emails characteristics and have a high statistical distribution. In some embodiments, the methods further comprise: the analysis and data warehouse module determines degree of variance of each email characteristic when compared with the similar email characteristic from prior messages associated with one or more of the recipient or the sender; the analysis and data warehouse module establishes a score based on the determined degree of variance for each email characteristic and a pre-assigned weight for each characteristic and the analysis and data warehouse module obtains a combined score by adding scores of one or more of the email characteristics in the received email based on the pre-assigned weights. In some embodiments, the methods further comprise: the analysis and data warehouse module stores logs of received email message and any associated phishing activity along with details of why the received email message was determined to be the phishing message in the database and the configuration and management module outputs the logs of the received emails and any associated phishing activity for viewing on a display device. In some embodiments, the methods further comprise: the mail handler module quarantines received email messages determined to be the phishing message as quarantined emails; the configuration and management module forwards quarantined emails to certain users; the configuration and management module adds certain text to the header or subject of quarantined emails to mark them as suspect and the configuration and management module outputs the quarantined emails for viewing on a display device. In some embodiments, the methods further comprise: the mail handler module changes the Reply-To email address of the new received email message determined to possibly be the phishing message to a custom email address based on settings in the configuration and management module and allows the new received email message to be delivered to the original emails intended recipient; upon receiving a reply at the custom email address the analysis and warehouse module does a further inspection of one of the original email or the response to the original received email message; the configuration and management module quarantines the response; the configuration and management module forward quarantined response to certain users; and wherein the mail handler module replaces the altered custom Reply-To email address with the original Reply-To email address and delivers the email response. In some embodiments, the methods further comprise: either the email client plugin module or the outbound mail relay module parses outbound emails sent by the recipient based on a set of predetermined email characteristics to determine if the outbound email is a response or forward of a previously received email by the recipient; the analysis and data warehouse module updates the database based on the above determination to indicate that the characteristics of the previously received email are more likely to represent a legitimate sender; the analysis and data warehouse module compares ongoing emails received from the sender with stored email characteristics; and the analysis and data warehouse module declares any of the ongoing emails received from the sender as the phishing message based on the outcome of the comparison. In some embodiments, the methods further comprise the mail handler module along with the email client plugin module includes visual identifications and reasoning information to the received email message based on the outcome of the comparison to assist the recipient of the nature of the received email message. In some embodiments, the methods further comprise the analysis and data warehouse module determines coordinated phishing attacks against an organization by spotting the phishing messages having similar characteristics against multiple recipients in the organization. In some embodiments, the methods further comprise the organization analysis module monitors changing patterns of an outbound email message to determine whether an email client has been compromised and the sender is sending the phishing message. In some embodiments, the methods further comprise either the email client plugin module or the configuration and management module allows a users to specify a received email message as the phishing messages and use the email characteristics of the specified received email message to filter received email messages to other users in the organization of the recipient. In some embodiments, the methods further comprise the configuration and management module allows administrators to specify the combination of a set of email characteristics as indicative of the phishing messages and the analysis and data warehouse module then flags new received email messages with similar characteristics as new phishing messages.

In another example embodiment, a system for analyzing electronic messages for phishing message detection comprises a system similar to that illustrated in FIG. 1 configured to execute the methods of electronic message analysis utilizing information from online social networks. In this embodiment, the methods comprise receiving an email message from one or more sender by one or more recipients via the mail handler module; obtaining email characteristics by parsing the received email message based on a set of predetermined email characteristics by the analysis and data warehouse module; comparing one or more of the email characteristics of the received email message with email characteristics associated with one or more of the recipient or the sender by the analysis and data warehouse module; declaring the received email message by the recipient as a phishing electronic message based on the outcome of the comparison by the analysis and data warehouse module; and storing the received email messages characteristics associated with the recipient and the sender received email message in a database. In this embodiment, the email client plugin module along with the configuration and management module are configured to obtain background information associated with the recipient such as contacts from an online social network; wherein the analysis and data warehouse module stores the background information in the database; wherein the analysis and data warehouse module, upon receiving a received email message, determines whether the background information in the received email message is correct using the stored background information; and wherein the analysis and data warehouse module uses the outcome of the above determination as a factor in declaring the received email as the phishing message. In some embodiments, the analysis and data warehouse comparison of email sender to online social network information comprises: one of the email client plugin or the configuration and management module accepting third party authentication credentials from users for online social network or membership systems; one of the email client plugin or the configuration and management module storing such authentication credentials in the database; the analysis and data warehouse module periodically using such authentication credentials to access the electronic system, via website or programming interface to retrieve data including contacts names, email addresses, phone numbers, educational affiliations, employment data, residence and work address, languages spoken, date when they became related to the user on the online social network, date when they joined online social network, number of messages contact and user have exchanged, number of other contacts that contact and user are both related to, groups they share in common and the like; analysis and data warehouse module storing retrieved data and/or links to data in the database so that it is associated with a contact and can be retrieved on the basis of an email sender; the analysis and data warehouse module finding the relevant contact by comparing email senders name against the names of contacts retrieved from online social network; the analysis and data warehouse module finding the relevant contact by comparing email senders email address against the email address of contacts retrieved from the recipient online social network; the analysis and data warehouse module finding the relevant contact by comparing email senders email address against the domain names associated with the contacts places of employment or places of education; the analysis and data warehouse module upon finding the contact, comparing the language used in the email to languages indicated as those spoken by the contact; analysis and data warehouse module upon finding the contact, determining the physical location of where the email was sent from by cross referencing the IP address of the sent email against a GeoIP database and subsequently comparing this location against the physical location of the contact or phone number area code or place of employment or place of education as specified in the online social network; the analysis and data warehouse module upon finding the contact, determining the quality of the relationship between the email recipient and the contact by evaluating background information obtained from the online social network such as the length of time contact has spent on the online social network, length of time contact and email recipient have known each other, number of other contacts both contact and user share in common, number of groups contact and user participate in together, number of places of work, education shared by contact and user, number of message contact and email recipient have shared, number of online social network contact and email recipient are connected on and the like; and the analysis and data warehouse module determining the legitimacy of the email sender based on the above comparisons. In some embodiments, the methods further comprise: either the import module or the email client plugin module directly imports the received email messages received by the recipient over a predetermined time interval; the analysis and data warehouse module parses the recipient received email messages based on the set of predetermined email characteristics to obtain email characteristics of the imported emails; and the analysis and data warehouse module stores the obtained email characteristics associated with one or more of the recipient or sender in the database. In some embodiments, the methods further comprise: one of the import module or the email client plugin module directly imports the received email messages received by the recipient over a predetermined time interval; the analysis and data warehouse module groups the imported/new email into a first group based on the emails Sender Name, Sender Email Address, and the email addresses of the Recipients on the email and a second group based on emails Sender Name, Sender Email Address; the analysis and data warehouse module accrues a certain minimum number of emails in each group; the text classification module performs training using one or more algorithms on the email data of the emails in each group; the analysis and data warehouse module stores the result of the training; the analysis and data warehouse module parses the new received email message and group it in the first or the second group; the text classification module checks each trained algorithm to determine whether the new email is written in a similar style as the other emails belonging to that group; the analysis and data warehouse module uses the outcome to influence the likelihood that the new message is the phishing message; the text classification module updates the training of each algorithm in the test classification engine for the specified groups with the contents of the new email; and the analysis and data warehouse module stores the updated results of the training. In some embodiments, the methods further comprise: one of the import module or the email client plugin module directly imports emails received by the recipient over a predetermined time interval; the analysis and data warehouse module groups the imported/new email into patterns that are based on characteristics values present in a specific email that are likely to be present in other emails and pre-assigned characteristic data that place each characteristic into one or more of the following patterns: a sender and recipient group pattern representing the email characteristics of the sender and the recipient, a sender and recipient organization group pattern representing the email characteristics associated with the sender and an organization of the recipient, a sender organization and recipient group pattern representing the email characteristics associated with an organization of the sender and the recipient, a sender organization and recipient organization group pattern representing the email characteristics associated with the organization of the sender and the organization of the recipient, a sender organization group pattern representing the email characteristics associated with the organization of the sender organization and a sender group pattern representing the email characteristics associated with the sender; the analysis and data warehouse stores the patterns in the database along with information regarding the count of emails with characteristics that place it in a specific group as well as the dates on which emails belonging to a group were received; the analysis and data warehouse module formulates a confidence score for each pattern based upon the number of emails received conforming to a pattern; the analysis and data warehouse module formulates a newness score for each pattern indicating the duration of time for which the pattern has been active; the analysis and data warehouse module determines if a new received email message belongs to a pre-existing pattern or requires the creation of a new pattern; the analysis and data warehouse module scores the new received email message based upon the pattern its characteristics match if any, and the patterns confidence and newness scores; the analysis and data warehouse module uses the outcome to influence the likelihood that the new message is the phishing message; and the analysis and data warehouse module updates the database with data reflecting the pattern, characteristics and appearance of the new received email message. In some embodiments, the methods further comprise: the analysis and data warehouse module obtains a stored email characteristic associated with one or more of the recipient or the sender along with their statistical distribution; and the analysis and data warehouse module compares one or more of the email characteristics of the new received email message with the obtained email characteristics associated with one or more of the recipient or the sender that are similar to the new received email message characteristic and have a high statistical distribution. In some embodiments, the methods further comprise: one of the email client plugin module or the outbound mail relay module parses outbound emails sent by the recipient based on a set of predetermined email characteristics to determine if the outbound email is a response or forward of a previously received email by the recipient; the analysis and data warehouse module updates the database based on the above determination to indicate that the characteristics of the previously received email are more likely to represent a legitimate sender; the analysis and data warehouse module compares ongoing emails received from the sender with stored email characteristics; and the analysis and data warehouse module declares any of the ongoing emails received from the sender as the phishing message based on the outcome of the comparison.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact methods and operation shown and described, and accordingly, all suitable modifications and equivalents may be resorted to, falling within the scope of the invention which is defined in the claims and their equivalents.

I claim:

1. A computer implemented method for analyzing electronic messages for phishing detection, comprising:
receiving a received email message to a recipient from a sender;
obtaining two or more email characteristics by parsing the received email message;
the two or more email characteristics comprising a sender email characteristic and a sender and recipient email characteristic;
applying a text classification engine to the sender and recipient email characteristic to define a first group email characteristic profile for the sender and the recipient representing a separate email characteristic profile of the sender and the recipient;
applying the text classification engine to the sender email characteristic to define a second group email characteristic profile for the sender representing a separate email characteristic profile of the sender;

receiving a new received email message;
applying the text classification engine to the new received email message to define a new received email message profile;
comparing the new received email message profile to the first group email characteristic profile and the second group email characteristic profile to determine whether the new received email message profile is similar to the first group email characteristic profile or similar to the second group email characteristic profile; and
determining whether the new received email message is a phishing message based on an outcome of the comparing.

2. The computer implemented method of claim 1 wherein:
applying a text classification engine to the sender and recipient email characteristic comprises applying a text classification engine to a group of the sender and recipient email characteristic to create the first group email characteristic profile; and
applying the text classification engine to the sender email characteristic comprises applying the text classification engine to a group of the sender email characteristic to create the second group email characteristic profile.

3. The computer implemented method of claim 1 further comprising:
storing a plurality of email characteristics of a plurality of received email messages in a database and grouping the plurality of email characteristics into a first group and a second group;
the first group comprising the email characteristics of a first subset of the plurality of received email messages wherein the first subset is selected based on at least one of a name of the sender and an email address of the sender and at least one of the name of the recipient and the email address of the recipient of the plurality of received email messages;
the second group comprising the email characteristics of a second subset of the plurality of received email messages wherein the second subset is selected based on at least one of the name of the sender and the email address of the sender of the plurality of received email messages; and
applying a text classification engine to the sender and recipient email characteristic comprises applying the text classification engine to the first group to define the first group email characteristic profile; and
applying the text classification engine to the sender email characteristic comprises applying the text classification engine to the second group to define the second group email characteristic profile.

4. The computer implemented method of claim 1 wherein the two or more email characteristics comprise a content of the received email.

5. The computer implemented method of claim 3 further comprising:
accruing a minimum number of received email messages in each of the first group and second group; and
applying the text classification engine to an email characteristic of the minimum number of received email messages in each of the first group and second group to update the first group email characteristic profile and the second group email characteristic profile.

6. The computer implemented method of claim 1 further comprising:
importing a plurality of received email messages received by the recipient as imported received email messages over a predetermined time interval;
obtaining a plurality of email characteristics of the imported received email messages by parsing the plurality of received email message based on a set of predetermined email characteristics; and
storing the plurality of email characteristics associated with one of the recipient or the sender in a database.

7. The computer implemented method of claim 1 further comprising:
importing a plurality of email characteristics and grouping the plurality of email characteristics into a first group and a second group;
the first group comprising the plurality of email characteristics of a plurality of received email messages selected based on a name of the sender, an email address of the sender and a name and an email address of the recipient of the received email message;
the second group comprising the plurality of email characteristics of the plurality of received email messages selected based on the name of the sender and the email address of the sender of the received email message; and
applying a text classification engine to the sender and recipient email characteristics comprises applying the text classification engine to the first group to create the first group email characteristic profile; and
applying the text classification to the sender email characteristic comprises applying the text classification engine to the second group to define the second group email characteristic profile.

8. The computer implemented method of claim 1, further comprising:
storing a plurality of email characteristics of the received email message in a database;
grouping the plurality of email characteristics of received email message into a plurality of pattern groupings, each pattern grouping being defined by a pattern characteristic;
storing the pattern groupings in a database along with a count of received email messages with an email characteristic that places it in the pattern grouping;
receiving a new received email message;
comparing an email characteristic of the new received email message with the pattern characteristic; and
declaring the new received email message by the recipient as the phishing message based on the outcome of the comparing.

9. The computer implemented method of claim 8 wherein the pattern groupings comprise at least one of the group consisting of:
a sender and recipient group pattern representing the email characteristics of the sender and the recipient;
a sender and recipient organization group pattern representing the email characteristics associated with the sender and an organization of the recipient;
a sender organization and recipient group pattern representing the email characteristics associated with an organization of the sender and the recipient;
a sender organization and recipient organization group pattern representing the email characteristics associated with the organization of the sender and the organization of the recipient;
a sender organization group pattern representing the email characteristics associated with the organization of the sender organization; and
a sender group pattern representing the email characteristics associated with the sender.

10. The computer implemented method of claim 1 further comprising:
   allowing an administrator to specify at least one email characteristic as at least one email characteristic indicative of a phishing message; and
   flagging the new received email message as a new phishing message if the new received email message has the at least one email characteristic matching the email characteristic indicative of a phishing message.

11. The computer implemented method of claim 1 wherein the step of applying the text classification engine to the sender and recipient email characteristic to define a second email characteristic profile for the sender and the recipient is done without the recipient reading the email message.

12. The computer implemented method of claim 1 wherein:
   the method further comprises applying the text classification engine to a sender and a recipient organization email characteristic to define a third group email characteristic profile for the sender and a recipient organization; and
   the step of comparing the new received email message profile to the first email characteristic profile and the second group email characteristic profile to determine whether the new received email message profile is similar to the first group email characteristic profile or similar to the second group email characteristic profile further comprises comparing the new received email message profile to the third group email characteristic profile to determine whether the new received email message profile is similar to the first email characteristic profile or similar to the second email characteristic profile or similar to the third group email characteristic profile.

13. The computer implemented method of claim 12 further comprising:
   accruing a minimum number of received email messages in a third group of email characteristics; and
   applying the text classification engine to an email characteristics of the minimum number of received email messages in the third group of email characteristics to update the third group email characteristic profile.

14. The computer implemented method of claim 12 further comprising:
   storing a plurality of email characteristics in a database and grouping the plurality of email characteristics into a first group, a second group and a third group;
   the first group comprising the plurality of email characteristics of a plurality of received email messages selected from one of a name of the sender, an email address of the sender, the name of the recipient or the email address of the recipient of the plurality of received email messages; and
   the second group comprising the plurality of email characteristics of the plurality of received email messages selected from one of the name of the sender or the email address of the sender of the plurality of received email messages; and
   the third group comprising the plurality of email characteristics of the plurality of received email messages selected from one of the name of the sender, the email address of the recipient or the email domain of a recipient organization.

15. The computer implemented method of claim 14 further comprising:
   applying the text classification engine to the first group of the plurality of email characteristics to create the first group email characteristic profile;
   applying the text classification engine to the second group of the plurality of email characteristics to create the second group email characteristic profile; and
   applying the text classification engine to the third group of the plurality of email characteristics to create the third group email characteristic profile.

16. A computer implemented method for analyzing electronic messages for phishing detection, comprising:
   receiving a received email message to a recipient from a sender;
   obtaining an email characteristic by parsing the received email message;
   the email characteristic comprising one or more of a sender email characteristic or a recipient email characteristic;
   storing the email characteristic in a database;
   applying a text classification engine to the email characteristic to define an email characteristic profile;
   receiving a new received email message;
   applying the text classification engine to the new received email message to define a new received email message profile;
   comparing the new received email message profile to the email characteristic profile to determine whether the new received email message profile is similar to the email characteristic profile;
   determining whether the new received email message is a phishing message based on an outcome of the comparing;
   storing the email characteristic in a database comprises storing a plurality of email characteristics in the database;
   grouping the plurality of email characteristics into a first group and a second group;
   the first group comprising at least one of the plurality of email characteristics of a plurality of received email messages selected based on a name of the sender, an email address of the sender and the name and the email address of the recipient of the plurality of received email messages;
   the second group comprising at least one of the plurality of email characteristics of the plurality of received email messages selected based on the name of the sender and the email address of the sender of the plurality of received email messages;
   applying a text classification engine to the email characteristic comprises applying a text classification engine to the first group and the second group to create a first group email characteristic profile and a second group email characteristic profile; and
   comparing the new received email message profile to the email characteristic profile comprises comparing the new received email message profile to at least one of the first group email characteristic profile and the second group email characteristic profile.

17. The computer implemented method of claim 16 wherein the email characteristic comprises a content of the received email message and the new received email characteristic comprises a content of the new received email message.

18. The computer implemented method of claim 16 further comprising:
   accruing a minimum number of received email messages in each of a first group and a second group; and
   applying the text classification engine to an email characteristic of the minimum number of received email messages in each of the first group and second group to update the first group email characteristic profile and the second group email characteristic profile.

19. The computer implemented method of claim 16 wherein:

the method further comprises applying the text classification engine to the email characteristic to define a third group email characteristic profile for the sender and a recipient organization; and the step of comparing the new received email message profile to the first email characteristic profile and the second group email characteristic profile to determine whether the new received email message profile is similar to the first group email characteristic profile or similar to the second group email characteristic profile further comprises comparing the new received email message profile to the third group email characteristic profile to determine whether the new received email message profile is similar to the first email characteristic profile or similar to the second email characteristic profile or similar to the third group email characteristic profile.

20. The computer implemented method of claim 19 further comprising:

accruing a minimum number of received email messages in a third group of email characteristics; and applying the text classification engine to the third group of email characteristics to update the third group email characteristic profile.

21. A computer implemented method for analyzing electronic messages for phishing detection, comprising:

receiving a received email message to a recipient from a sender;

obtaining two or more email characteristics by parsing the received email message based on at least one predetermined email characteristic;

the two or more email characteristics comprising a sender email characteristic and a sender and recipient organization email characteristic;

applying a text classification engine to the sender and recipient organization email characteristic to define a first group email characteristic profile for the sender and the recipient organization representing a separate email characteristic profile of the sender and the recipient organization;

applying the text classification engine to the sender email characteristic to define a second group email characteristic profile for the sender representing a separate email characteristic profile of the sender;

receiving a new received email message;

applying the text classification engine to the new received email message to define a new received email message profile;

comparing the new received email message profile to the first group email characteristic profile and the second group email characteristic profile to determine whether the new received email message profile is similar to the first group email characteristic profile or similar to the second group email characteristic profile; and determining whether the new received email message is a phishing message based on an outcome of the comparing.

22. The computer implemented method of claim 21 further comprising:

presenting an administrator with a plurality of predetermined email characteristics; and selecting one of the plurality of predetermined email characteristics as the predetermined email characteristic.

23. The computer implemented method of claim 21 further comprising:

accruing a minimum number of received email messages in each of first group and a second group; and applying the text classification engine to an email characteristic of the minimum number of received email messages in each of the first group and second group to update the first group email characteristic profile and the second group email characteristic profile.

24. The computer implemented method of claim 21 further comprising:

importing a plurality of received email messages received by the recipient as imported received email messages over a predetermined time interval;

obtaining a plurality of email characteristics of the imported received email messages by parsing the plurality of received email messages based on a set of predetermined email characteristics; and storing the plurality of email characteristics associated with one of the recipient organization or the sender in a database.

* * * * *